(12) United States Patent
Butts

(10) Patent No.: US 8,103,866 B2
(45) Date of Patent: Jan. 24, 2012

(54) SYSTEM FOR RECONFIGURING A PROCESSOR ARRAY

(75) Inventor: Michael R. Butts, Beaverton, OR (US)

(73) Assignee: Nethra Imaging Inc., Santa Clara, CA (US)

( * ) Notice: Subject to any disclaimer, the term of this patent is extended or adjusted under 35 U.S.C. 154(b) by 868 days.

(21) Appl. No.: 12/018,062

(22) Filed: Jan. 22, 2008

(65) Prior Publication Data

US 2008/0229093 A1   Sep. 18, 2008

Related U.S. Application Data

(63) Continuation-in-part of application No. 11/672,450, filed on Feb. 7, 2007, and a continuation-in-part of application No. 11/557,478, filed on Nov. 7, 2006, now abandoned, and a continuation-in-part of application No. 10/871,329, filed on Jun. 18, 2004, now Pat. No. 7,865,637.

(60) Provisional application No. 60/881,275, filed on Jan. 19, 2007, provisional application No. 60/734,623, filed on Nov. 7, 2005.

(51) Int. Cl.
    *G06F 9/00* (2006.01)
(52) U.S. Cl. .............. 713/100; 326/38; 326/39; 712/15
(58) Field of Classification Search ................. 326/38, 326/39; 712/15; 713/100
    See application file for complete search history.

(56) References Cited

U.S. PATENT DOCUMENTS

| 6,145,072 | A | 11/2000 | Shams et al. |
| 6,204,687 | B1 * | 3/2001 | Schultz et al. ................. 326/40 |
| 6,960,935 | B1 * | 11/2005 | Sun ................................. 326/39 |
| 7,415,594 | B2 | 8/2008 | Doerr et al. |

* cited by examiner

*Primary Examiner* — Albert Wang
(74) *Attorney, Agent, or Firm* — Marger Johnson & McCollom PC

(57) ABSTRACT

Embodiments of the invention are directed to a system for reconfiguring a processor array while it is currently operating. The reconfiguration system uses configuration chains streamed down communication channels that are set for the re-configuration process, then re-set after the reconfiguration process has completed.

13 Claims, 18 Drawing Sheets

SYSTEM FOR RECONFIGURING A PROCESSOR ARRAY

CROSS REFERENCE TO RELATED APPLICATIONS

This application claims benefit of U.S. provisional application 60/881,275, filed Jan. 19, 2007, entitled SYSTEM FOR CONFIGURING AND RECONFIGURING A PROCESSOR ARRAY. This application additionally claims priority to presently pending U.S. application Ser. No. 11/557,478, filed Nov. 7, 2006, entitled RECONFIGURABLE PROCESSING ARRAY HAVING HIERARCHICAL COMMUNICATION NETWORK, which in turn claims benefit from U.S. Provisional Application 60/734,623, filed Nov. 7, 2005, entitled TESSELLATED MULTI-ELEMENT, PROCESSOR AND HIERARCHICAL COMMUNICATION NETWORK. This application further claims priority to presently pending U.S. patent application Ser. No. 11/672,450, filed Feb. 7, 2007, entitled PROCESSOR HAVING MULTIPLE INSTRUCTION SOURCES AND EXECUTION MODES, and to presently pending U.S. patent application Ser. No. 10/871,329, filed Jun. 18, 2004, entitled SYSTEM OF HARDWARE OBJECTS, all assigned to the assignee of the present invention and all incorporated by reference herein. Additionally, this application is related to U.S. application Ser. No. 12/018,045, filed Jan. 22, 2008, entitled SYSTEM FOR CONFIGURING A PROCESSOR ARRAY.

TECHNICAL FIELD

This disclosure relates to microprocessor computer architecture, and, more particularly, to a system for reconfiguring a portion of an array of processors connected through a computing fabric while another portion of the array of processors continues to run.

BACKGROUND

Typical microprocessors include an execution unit, storage for data and instructions, and an arithmetic unit for performing mathematical operations. Much of the microprocessor development over the past two decades has been in speeding the operating clock and widening the operational datapath. Specialized techniques such as predictive branching and deeper staged execution pipelines have also added performance at the cost of increased complexity.

One emerging idea to gain even more performance from processors is to include multiple "execution cores" within a single microprocessor. These new processors include on the order of 2-8 processors, each of which operates simultaneously and in parallel. Although multi-core processors seem to have higher composite performance than single-core processors, the amount of additional overhead to ensure that each processor operates efficiently dramatically increases with each additional core. For instance, memory bottlenecks and synchronization must be explicitly managed in multi-core systems, which adds overhead in design and operation. Because the increased complexity in having multiple cores increases as more cores are added, it is doubtful that gains from adding additional execution cores into a singe microprocessor can continue before the gains diminish substantially.

Newer microprocessor designs include arrays of processors, on the order of tens to thousands implemented on a single integrated circuit and connected to one another through a compute fabric. Such a processor array is described in the above-referenced '036 application. Programming or configuring such a system is difficult to synchronize startup and time consuming because of the huge amount of state needed to set up a large number of processors. Reconfiguring such a system when running is extremely difficult because the exact state of each is difficult or impossible to predict.

Embodiments of the invention address and other limitations in the prior art.

DETAILED DESCRIPTION

Figure 1:
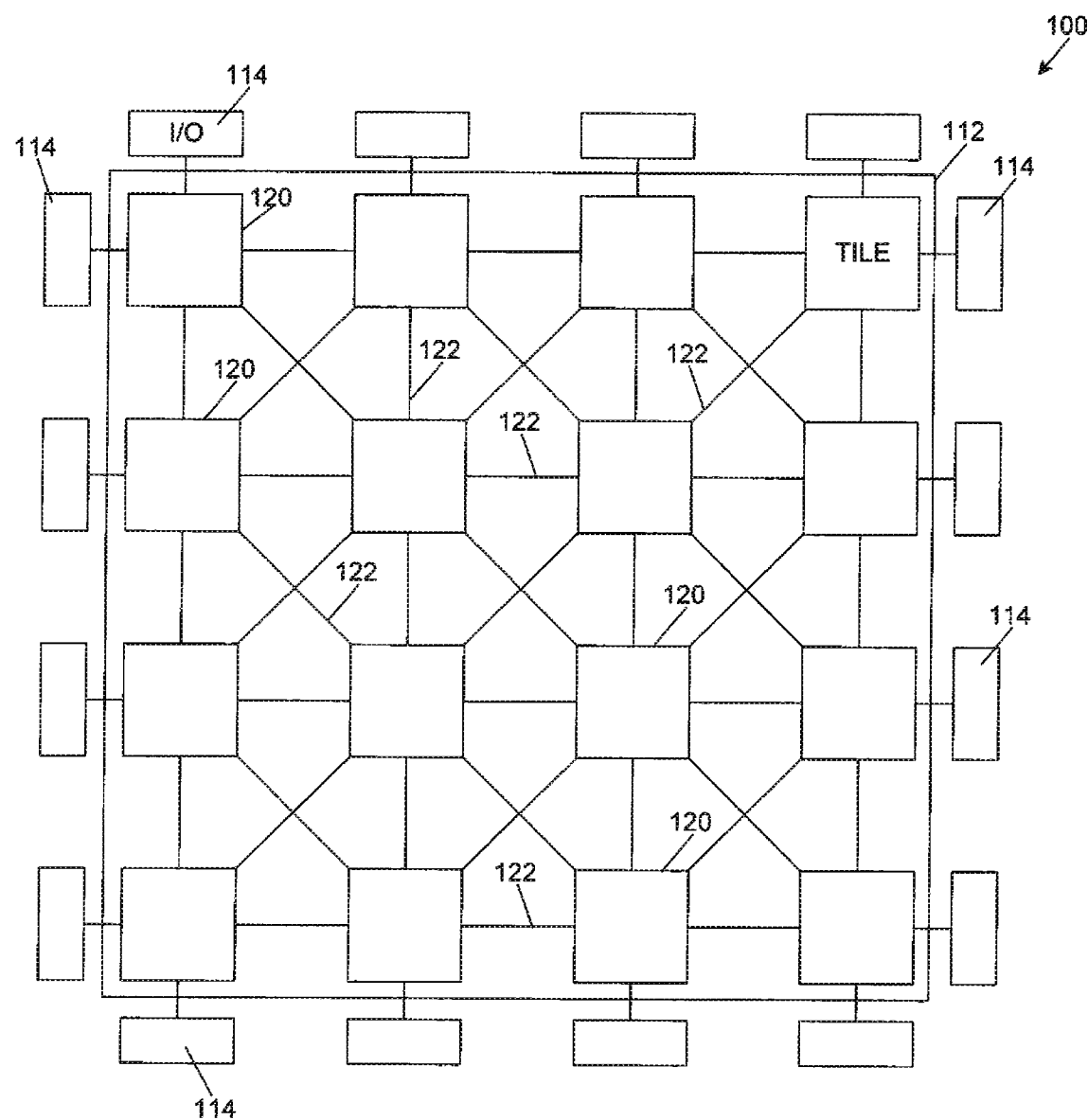
FIG. 1 is a block diagram of an integrated circuit platform formed of a central collection of tessellated operating units surrounded by I/O circuitry according to embodiments of the invention.

FIG. 1 illustrates an example tessellated multi-element processor platform 100 according to embodiments of the invention. Central to the processor platform 100 is a core 112 of multiple tiles 120 that are arranged and placed according to available space and size of the core 112. The tiles 120 are interconnected by communication data lines 122 that can include protocol registers as described below.

Additionally, the platform 100 includes Input/Output (I/O) blocks 114 placed around the periphery of the platform 100. The I/O 114 blocks are coupled to some of the tiles 120 and provide communication paths between the tiles 120 and elements outside of the platform 100. Although the I/O blocks 114 are illustrated as being around the periphery of the platform 100, in practice the blocks 114 may be placed anywhere within the platform 100. Standard communication protocols, such as USB, JTAG, PCIExpress, or Firewire could be connected to the platform 100 by including particularized I/O blocks 114 structured to perform the particular connection protocols.

The number and placement of tiles 120 may be dictated by the size and shape of the core 112, as well as external factors, such as cost. Although only sixteen tiles 120 are illustrated in FIG. 1, the actual number of tiles placed within the platform 100 may depend on multiple factors. For instance, as process technologies scale smaller, more tiles 120 may fit within the core 112. In some instances, the number of tiles 120 may be purposely be kept small to reduce the overall cost of the platform 100, or to scale the computing power of the platform 100 to desired applications. In addition, although the tiles 120 are illustrated as being equal in number in the horizontal and vertical directions, yielding a square platform 100, there is no reason that there cannot be more tiles in one direction than another. Thus, platforms 100 with any number of tiles 120, even one, in any geometrical configuration are specifically contemplated. Further, although only one type of tile 120 is illustrated in FIG. 1, different types and numbers of tiles may be integrated within a single processor platform 100.

Tiles 120 may be homogenous or heterogeneous. In some instances the tiles 120 may include different components. They may be identical copies of one another or they may include the same components in different geometries.

Figure 2:
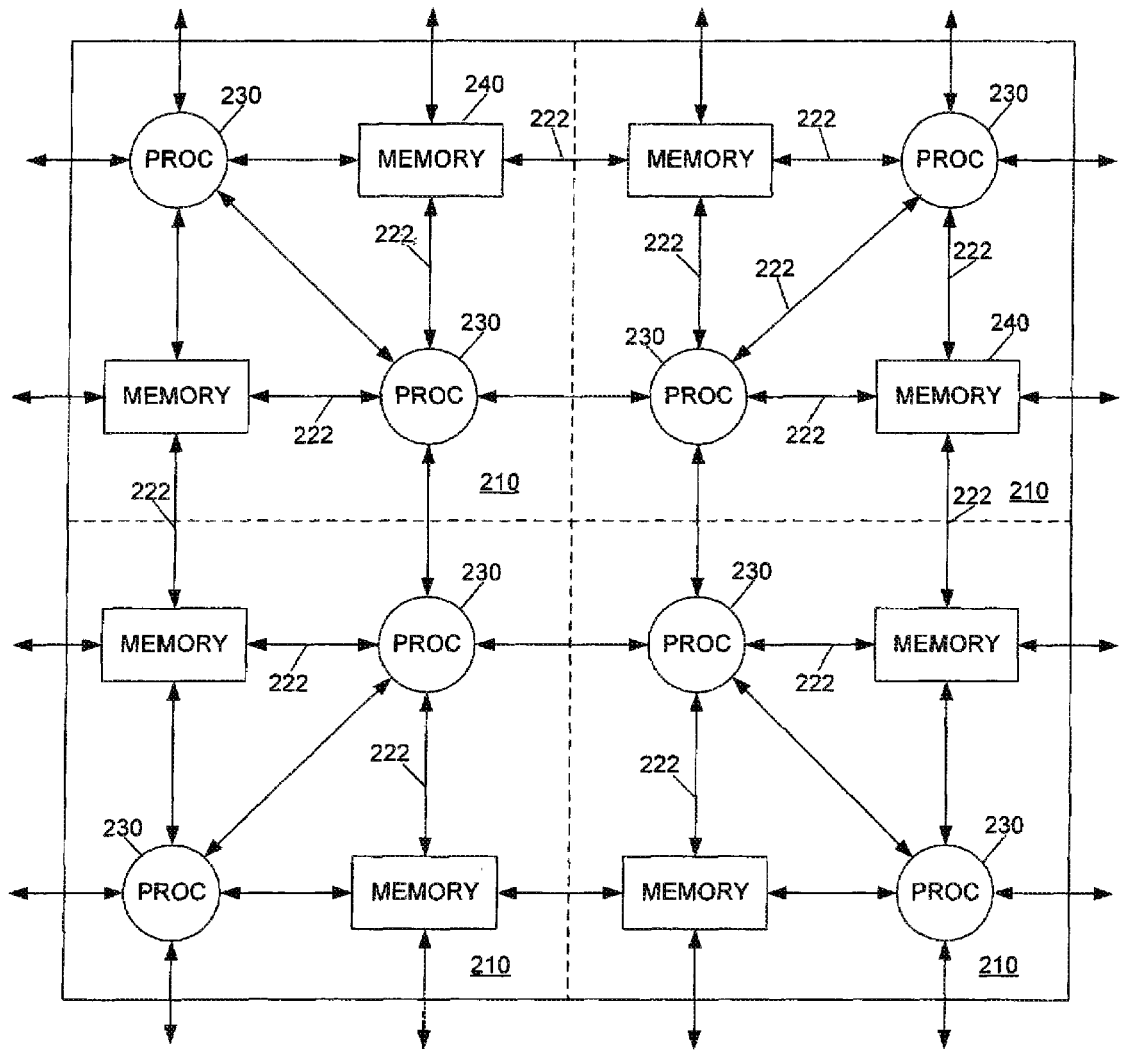
FIG. 2 is a block diagram illustrating several groups of processing units and memory units used to make the operating units of FIG. 1 according to embodiments of the invention.

FIG. 2 illustrates components of example tiles 210 of the platform 100 illustrated in FIG. 1. In this figure, four tiles 210 are illustrated. The components illustrated in FIG. 2 could also be thought of as one, two, four, or eight tiles 120, each having a different number of processor-memory pairs. For the remainder of this document, however, a tile will be referred to as illustrated by the delineation in FIG. 2, having two processor-memory pairs. In the system described, there are two types of tiles illustrated, one with processors in the upper-left and lower-right corners, and another with processors in the upper-right and lower-left corners. Other embodiments can include different geometries, as well as different number of components. Additionally, as described below, there is no requirement that the number of processors equal the number of memory units in each tile 210.

In FIG. 2, an example tile 210 includes processor or "compute" units 230 and "memory" units 240. The processing units 230 include mostly computing resources, while the memory units 240 include mostly memory resources. There are, however, some memory components within the processing unit 230 and some computing components within the memory unit 240, as described below. In this configuration, each processing unit 230 is primarily associated with one memory unit 240, although it is possible for any processing unit to communicate with any memory unit within the platform 100 (FIG. 1).

Data communication lines 222 connect units 230, 240 to each other as well as to units in other tiles. Detailed description of components with the processing units 230 and memory units 240 begins with FIG. 5 below.

Figure 3:
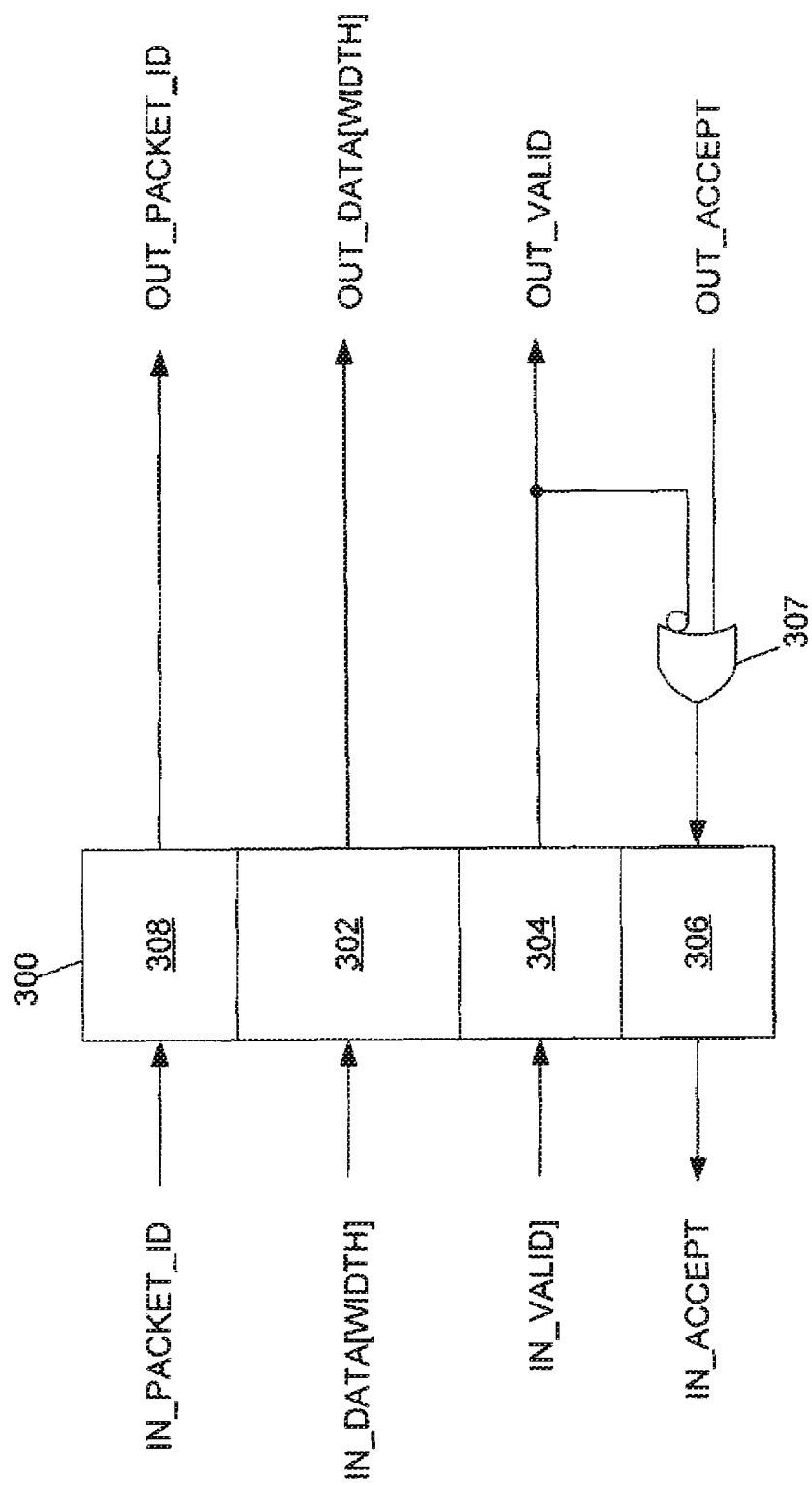
FIG. 3 is a block diagram of a data/protocol register used to connect various components within and between the processing units of FIG. 2.

FIG. 3 is a block diagram illustrating a protocol register 300, the function and operation of which is described in the '329 patent application referred to above. The register 300 includes a set of storage elements between an input interface and an output interface.

The input interface uses an accept/valid data pair to control dataflow. If both valid and accept are both asserted, the register 300 sends data stored in sections 302 and 308 to a next register in the datapath, and new data is stored in 302, 308. Further, if out_valid is de-asserted, the register 300 updates with new data while the invalid data is overwritten. This push-pull protocol register 300 is self synchronizing in that it only sends data to a subsequent register (not shown) if the data is valid and the subsequent register is ready to accept it. Likewise, if the protocol register 300 is not ready to accept data, it de-asserts the in_accept signal, which informs a preceding protocol register (not shown) that the register 300 is not accepting.

In some embodiments, the packet_id value stored in the section 308 is a single bit and operates to indicate that the data stored in the section 302 is in a particular packet, group or word of data. In a particular embodiment, a LOW value of the packet_id indicates that it is the last word in a message packet. All other words would have a HIGH value for packet_id. Using this indication, the first word in a message packet can be determined by detecting a HIGH packet_id value that immediately follows a LOW value for the word that precedes the current word. Alternatively stated, the first HIGH value for the packet_id that follows a LOW value for a preceding packet_id indicates the first word in a message packet. Only the first and last word of a data packet can be determined if using a single bit packet_id. Multiple bit packet identification information would allow for additional information about the transmitted data to be communicated as well.

The width of the data storage section 302 can vary based on implementation requirements. Typical widths would include 4, 8, 16, and 32 bits.

With reference to FIG. 2, the data communication lines 222 would include a register 300 at each end of communication lines. Additional registers 300 could be inserted anywhere along the communication lines without changing the logical operation of the communication. These additional registers 300 may be used to decrease the length that data must be transmitted within the platform 100.

Figure 4:
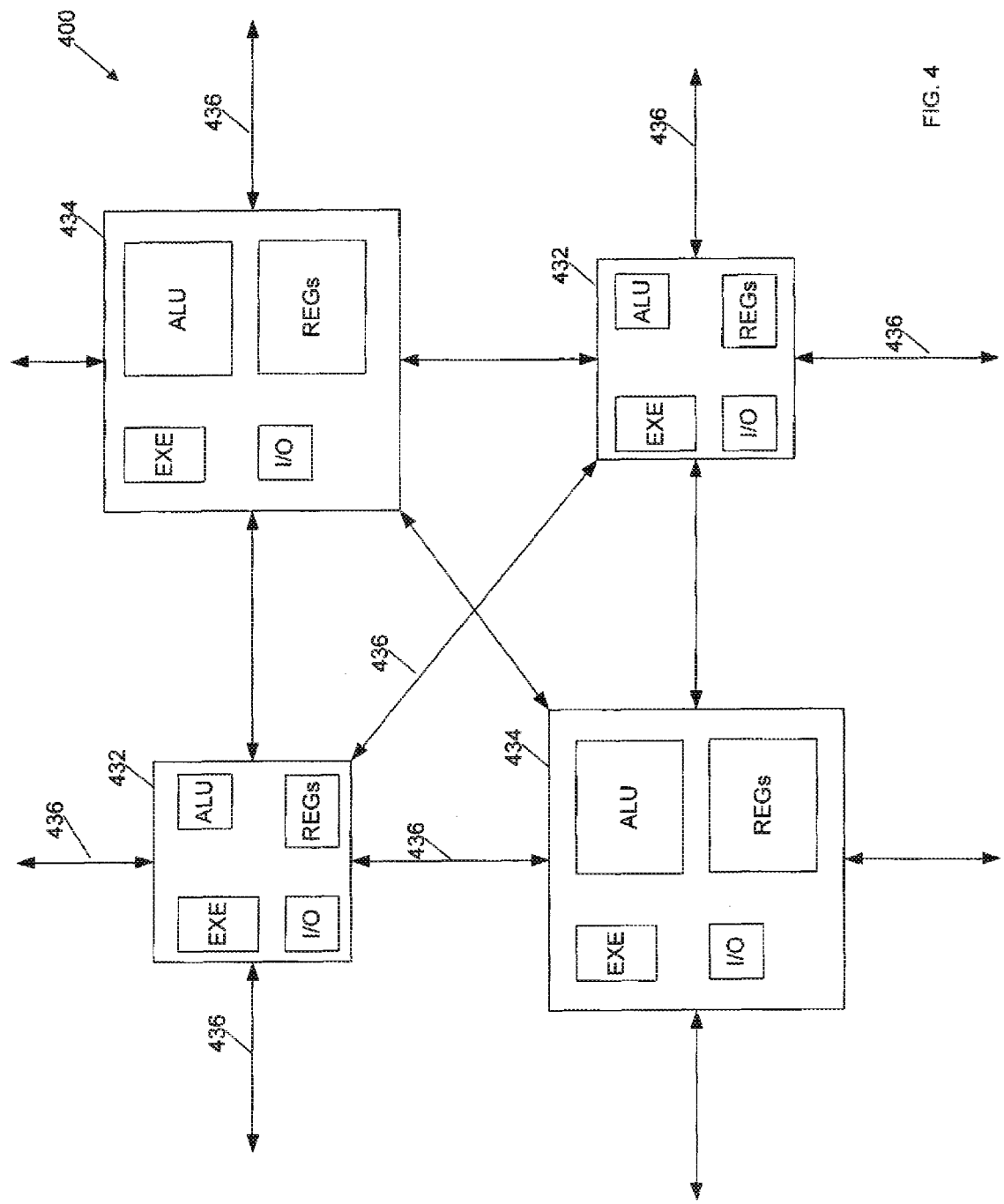
FIG. 4 is a block diagram of details of an example processing unit illustrated in FIG. 2 according to embodiments of the invention.

FIG. 4 illustrates a set of example elements forming an illustrative processing unit 400 which could be the same or similar to the processing units 230 of FIG. 2. In this example, there are two minor processors 432 and two major processors 434. The major processors 434 have a richer instruction set and include more memory than the minor processors 432, and are structured to perform mathematically intensive computations. The minor processors 432 are simpler processors than the major processors 434, and are structured to prepare instructions and data so that the major processors can operate efficiently and expediently.

In detail, each of the processors 432, 434 may include an execution unit, an Arithmetic Logic Unit (ALU), a set of Input/Output circuitry, and a set of registers. In an example embodiment, the registers of the minor processors 432 may total 64 words of instruction memory while the major processors include 256 words, for instance.

Communication channels 436 may be the same or similar to the data communication lines 222 of FIG. 2, which may include the data registers 300 of FIG. 3.

Figure 5:
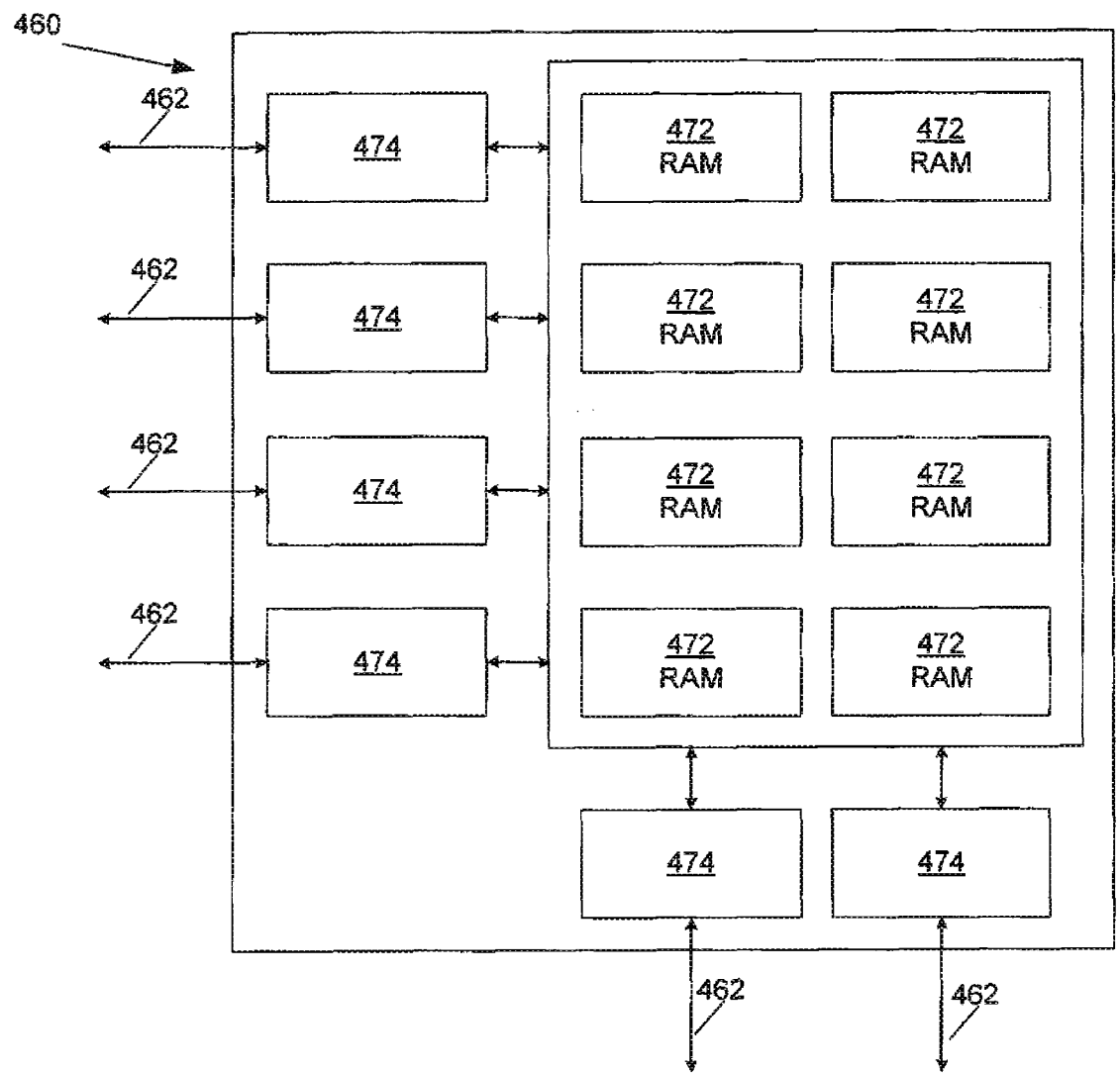
FIG. 5 is a block diagram of details of an example memory unit illustrated in FIG. 2 according to embodiments of the invention.

FIG. 5 illustrates example elements forming an illustrative memory unit 460, which could be an example implementation of the memory blocks 240 of FIG. 2. In this example, there are eight Random Access Memory (RAM) memory clusters 472 and six memory engines 474. The memory clusters 472 each contain an amount of computer memory, such as Static Random Access Memory (SRAM) in individual sections. Typically, each of the cluster 472 would contain the same amount of memory. The memory engines 474 operate to access memory and send the result to a destination. For example, a memory engine 474 can retrieve processor instructions and send them to one of the processors 432, 434 for operation. The memory engines 474 are also operative to stream data into one or more clusters 472, which allows for very efficient processing of large amounts of data. Further, multiple memory units 460 can be joined across nearest neighbor networks for operations that require more memory than is contained within a single unit. Communication between various memory units 460 may be different depending on which memory units 460 are connected. For instance, memory units 460 that are horizontally near one another cross a tile boundary, and nearest neighbor networks connecting these memory units would typically include circuitry that supports memory units operating at different clock speeds.

Figure 6:
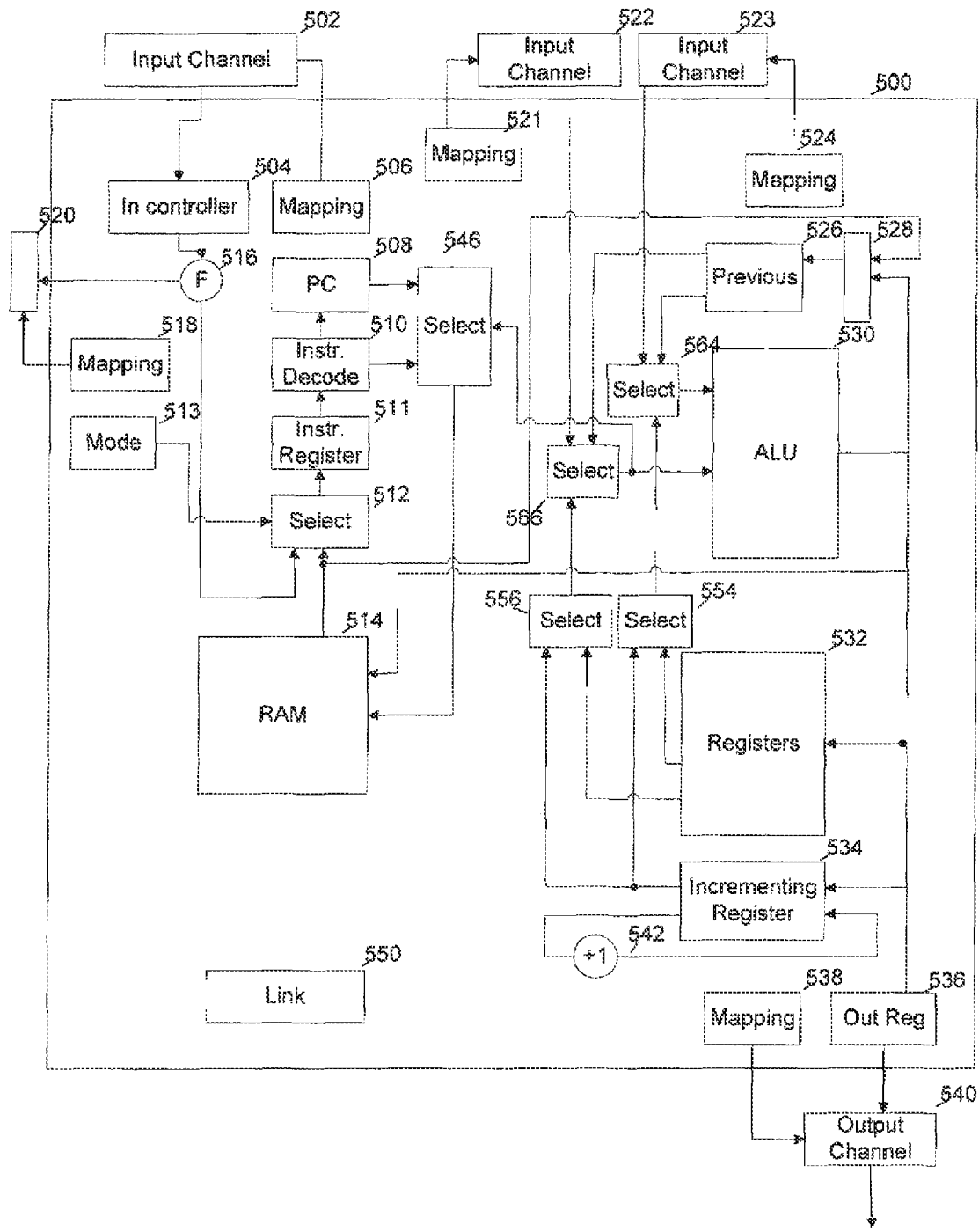
FIG. 6 is a block diagram of an example minor processor included in the processing unit of FIG. 4.

FIG. 6 illustrates an example processor 500 that could be an implementation of the minor processor 432 of FIG. 4.

Major components of the example processor 500 include input channels 502, 522, 523, output channels 520, 540. Channels may be the same or similar to those described in the '329 application referred to above. Additionally the processor 500 includes an ALU 530, registers 532, internal RAM 514, and an instruction decoder 510. The ALU contains functions such as an adder, logical functions, and a multiplexer. The RAM 514 is a small local memory that can contain any mixture of instructions and data. Instructions may be 16 or 32 bits wide, for instance.

The processor 500 has two execution modes: Execute-From-Channel (channel execution) and Execute-From-Memory (memory execution), as described in detail below.

In memory execution mode, the processor 500 fetches and executes instructions from the RAM 514, which is the conventional mode of processor operation. In memory execution mode, instructions are retrieved from the RAM 514, decoded in the decoder 510, and executed in a conventional manner by the ALU 530 or other hardware in the processor 500.

In channel execution mode, the processor 500 operates on instructions sent by an external process that is separate from the processor 500. These instructions are transmitted to the processor 500 over an input channel, for example the input channel 502. The original source for the code transmitted over the channel 502 is very flexible. For example, the external process may simply stream instructions that are stored in an external memory, for example one of the memories 240 of FIG. 3 that is either directly connected to or distant from the particular processor. With reference to FIG. 1, memories within any of the tiles 120 could be the source of instructions. Still referring to FIG. 1, the instructions may even be stored outside of the core 112 (for example stored on an external memory) and routed to the particular processor through one of the I/O blocks 114. In other embodiments the external process may generate the instructions itself, and not retrieve instructions that have been previously stored. Channel execution mode extends the program size indefinitely, which would otherwise be limited by the size of the RAM 514.

A map register 506 allows a particular physical connection to be named as the input channel 502. For example, the input channel 502 may be an output of a multiplexer (not shown) having multiple inputs. A value in the map register 506 selects which of the multiple inputs is used as the input channel 502. By using a logical name for the channel 502 stored in the map register 506, the same code can be used independent of the physical connections.

In channel execution mode, the processor 500 receives a linear stream of instructions directly from the input channel 502, one at a time, in execution order. The decoder 510 accepts the instructions, decodes them, and executes them in a conventional manner, with some exceptions described below. In channel execution mode, the processor 500 does not require that the streamed instructions are first stored in RAM 514 before used, which would potentially destroy values in RAM 514 stored before execute-from-channel was started. Before being decoded by the decode 510, the instructions from the input channel 502 are stored in an instruction register 511, in the order in which they are received from the input channel 502.

An input channel 502 may be one formed by data/protocol registers 300 such as that illustrated in FIG. 3. In such a system, the data held in register 302 would be an instruction destined for execution by the processor 500. Depending on the length of the instruction, each data word stored in the register 302 may be a single instruction, a part of a larger instruction, or multiple separate instructions. As used in this application, the label "input channel" may include any form of processor instruction delivery mechanism that is different than reading data from the RAM 514.

Because of the backpressure flow control mechanisms built into each data/protocol register 300 (FIG. 3), the processor 500 controls the rate at which instructions flow into the processor through the input channel 502. For instance, the processor 500 may be able to accept a new instruction on every clock cycle. More typical, however, is that the processor 500 may need more than one clock cycle to perform some of the instructions received from the input channel 502. In that case, an input controller 504 of the processor 500 would de-assert an "accept" signal, stopping the flow of instructions. When the processor 500 is next able to accept a further instruction, the input controller 504 asserts its accept signal, and the next instruction is taken from the input channel 502.

Specialized instructions for the processor 500 allow the processor to change from one execution mode to another, e.g., from memory execution mode to channel execution mode, or vice-versa. One such mode-switching instruction is callch, which forces the processor 500 to stop executing from memory and switch to channel execution. When a callch instruction is executed by the processor 500, the states of the program counter 508 and mode register 513 are stored in a link register 550. Additionally, a mode bit is written into a mode register 513, which in turn causes a selector 512 to get its next instruction from the input channel 502. A return instruction changes the processor 500 back to the memory execution mode by re-loading a program counter 508 and mode register 513 to the states stored in the link register 550. If a return instruction follows a callch instruction, the re-loaded mode register 513 will switch the selector 512 back to receive its input from the RAM 514.

While the processor 500 is in channel execution mode, two other instructions, jump and call, automatically cause the processor to switch back to memory execution mode. Like callch, when a call instruction is executed by the processor 500, the states of the program counter 508 and mode register 513 are stored in a link register 550. Additionally, a mode bit is written into a mode register 513, which in turn causes a selector 512 to receive its input from the RAM 514. Because instructions from the input channel 502 are received as a single stream, and it is impossible to jump arbitrarily within the stream, both jump and call are interpreted as memory execution modes. Thus, if the processor 500 is in channel execution mode and executes a jump or call instruction, the processor 500 switches back to memory execution mode.

Figure 7:
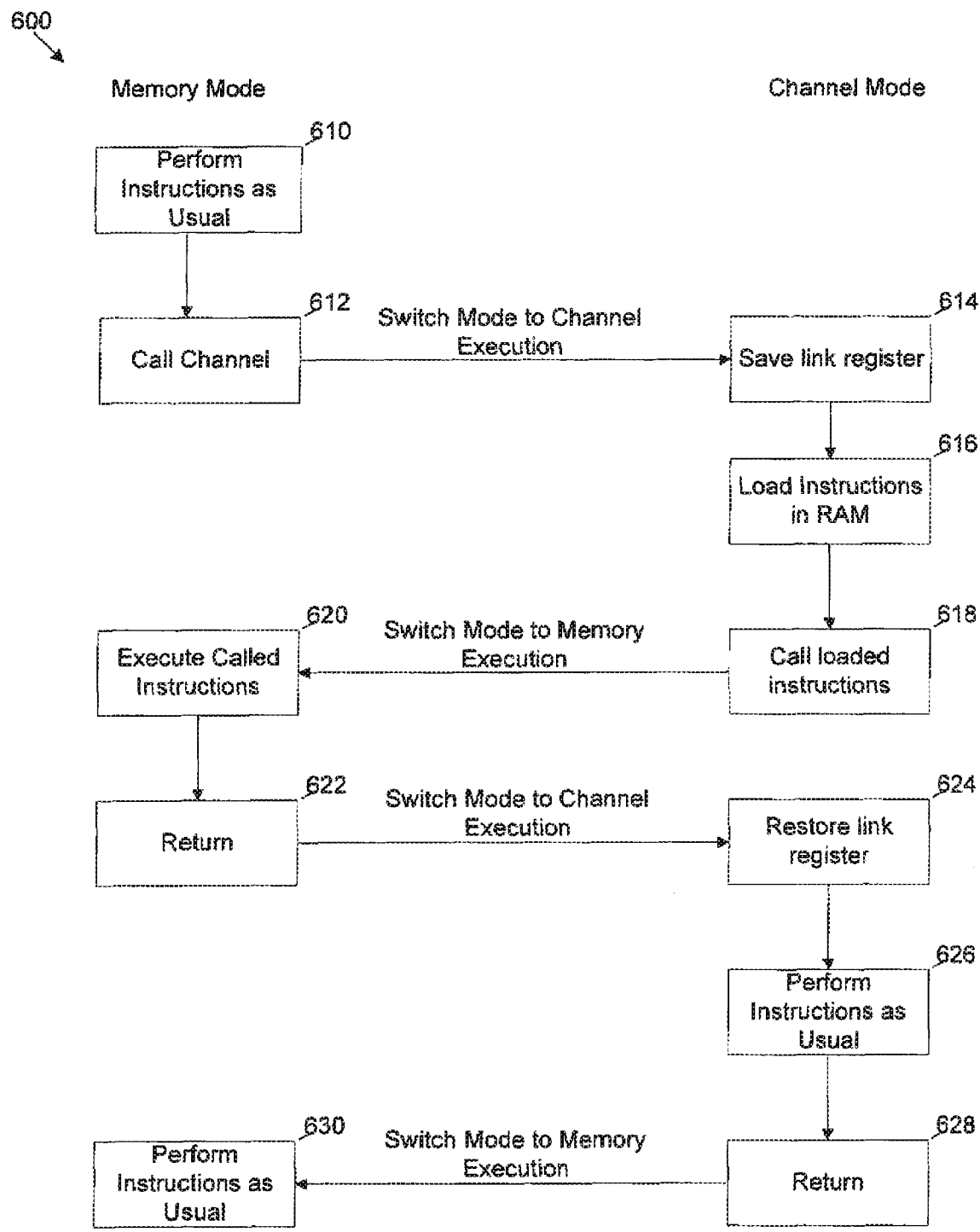
FIG. 7 is an example flow diagram illustrating different operating modes of the processors in a processing unit of FIG. 2.

FIG. 7 illustrates an example of switching execution modes. A flow 600 begins with a processor 500 in memory execution mode in a process 610, executing local code. A callch instruction is executed in process 612, which switches the processor 500 to channel execution mode. The state of the program counter 508 and mode register 513 are stored in the link register 550, and the mode register 513 is updated to reflect the new operation mode. The new link register 550 contents are saved in, for example, one of the registers 532, for later use, in a process 614.

Once in channel execution mode, the processor 500 operates from instructions from the input channel 502. If, for example, the programmer wishes to execute a loop of instructions, which is not possible in execute from channel mode, the programmer can load those instructions to a particular location in the RAM 514 in a process 616, and then call that location for execution in a process 618. Because the call instruction is by definition a memory execution mode process, the process 618 changes the mode register 513 to reflect that the processor 500 is back in memory execution mode, and the called instructions are executed in a process 620. After completing the called instructions, a return instruction while in memory execution mode causes the processor 500 to switch back to channel execution mode in a process 622. When back in channel execution mode, the process 624 restores the link register 550 to the state previously stored in the process 614. Next instructions are performed as usual in a process 626. Eventually, when the programmer wishes to change back to memory execution, another return instruction is issued in a process 628, which returns the processor 500 back to memory execution mode.

In addition to not being able to jump or call in channel execution mode, branching instruction flow while in channel execution mode is limited as well. Because the instruction stream from the input channel 502 only moves in a forward direction, only forward branching instructions are allowed in channel execution mode. Non-compliant or intervening instructions are ignored. In some embodiments of the invention, executing the branch command does not switch execution modes of the processor 500.

Additionally, multi-instruction loops that can be easily managed in the typical memory execution cannot be managed by a linear stream of instructions. Therefore, in channel execution mode, only loops of a single instruction can be considered legal instructions without extra buffering. Thus, looping a single instruction is the equivalent to executing a single instruction multiple times.

In some embodiments of the invention, all of the processors 500 throughout the entire core 112 (FIG. 1) are reset during power-up in channel execution mode. This allows an entire system to be booted and configured using temporary instructions streamed from an external source. In operation, when the core 112 is originally powered or reset, each of the processors throughout the core executes a callch instruction, which simply waits until a first instruction is streamed in from the input channel 502. This mechanism has a number of advantages over traditional processor configuration code. For instance, there is no special hardware-specific loading mechanisms needed to be linked in at compile time, the configuration can be as large or complex as desired, and the setup code only resides during configuration and so consumes no memory during normal execution of the processor. Such a system also lends itself to being re-programmed or re-configured during platform 100 operation. Details of configuration and re-configuration appear below.

Another mode of operation uses a fork element 516 of FIG. 6 to duplicate instructions. If the mapping register 518 is appropriately set, code duplicated by the fork 516 is sent to the output register 520. The output register 520 of a particular processor 500 may connect to an input channel 502 of another processor. Thus, multiple processors can all execute the same stream of instructions as for Single Instruction Multiple Data (SIMD) systems. The synchronization of such a SIMD multi-processor system can be effected either implicitly through the topology of how the configuration instructions flow, or explicitly using transmitted messages on other channels by placing channel reads and writes in the configuration instructions.

Various components of the processor 500 may be used to support the ability of the processor to support having two execution modes. For example, instructions or data from an input channel 522 can be directly loaded into the RAM 514 by appropriately setting selectors 566, and 546. Further, any data or instructions generated by the ALU 530, registers 532, or an incrementing register 534 can be directly stored in the RAM 514. Additionally, a "previous" register 526 stores data from a previous processing cycle, which can also be stored into the RAM 514 by appropriately setting the selectors 566 and 546. In essence, any of the data storage elements or processing elements of the processor 500 can be arranged to store data and/or instructions into the RAM 514, for further operation by other execution elements in the processor. All of these procedures directly support the memory execution mode for the processor 500. When this flexibility of memory execution mode is combined with the ability to execute instructions directly from an input channel, it is possible to program the processor very efficiently and effectively in normal operation.

Processor architecture can vary widely, and specific implementations described herein are not the only way to implement the invention. For instance, sizes of the RAM, registers, and configuration of ALUs, and architecture of various data and operation paths may all be variables left up to the implementation engineer. For instance, the major processor 434 of FIG. 5 could have several and pipelined ALUs, double width instruction set, larger RAM, and additional registers as compared to the processor 500 of FIG. 6, yet still include all of the components to implement a multi-source processing system that accords to embodiments of the invention.

Figure 8:
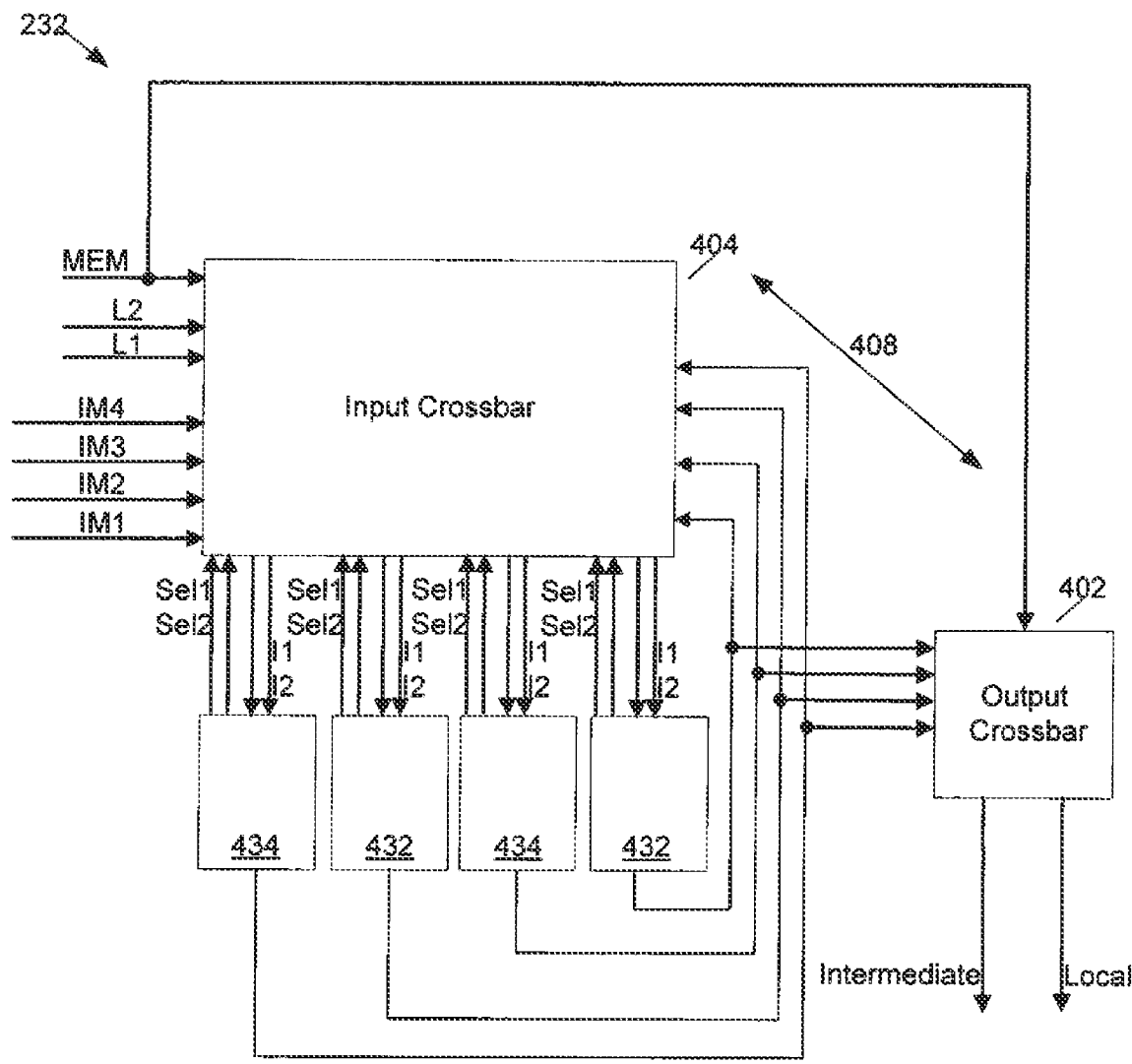
FIG. 8 is a block diagram of a communication system within a processing unit of FIG. 2 according to embodiments of the invention.

FIG. 8 is a block diagram illustrating programmable or settable communication paths of a communication network within an example processing unit 232, which can be an embodiment of processing unit 230 of FIG. 2. Central to the communication network of the processor group 232 is an input crossbar, 404, the output of which is coupled to four individual processors. In this example, each processing unit 232 includes two major processors 434 and two minor processors 432. From a communication standpoint, each of the processors 432, 434 are identical, although in practicality, they may have different capabilities.

Each of the processors has two inputs, I1 and I2, and two selection lines Sel1, and Sel2. In operation, control signals on the output lines Sel1, Sel2 programmatically control the input crossbar 404 to select which of the inputs to the input crossbar 404 will be selected as inputs on lines I1 and I2, for each of the four processors, separately. In some embodiments of the invention, the inputs I1 and I2 of each processor can select any of the input lines to the input crossbar 404. In other embodiments, only subsets of all of the inputs to the input crossbar 404 are capable of being selected. This latter embodiment could be implemented to minimize cost, power consumption or area, or increase performance of the input crossbar 404.

Inputs to the input crossbar 404 include a communication channel from the associated memory unit 240 two local channel communication lines, L1, L2, and four intermediate communication lines IM1-IM4. These inputs are discussed in detail below.

Protocol registers 300 may be placed anywhere along the communication paths. For instance, protocol registers 300 (of FIG. 3) may be placed at the junction of the inputs L1, L2, IM1-IM4, and memory 240 with the input crossbar 404, as well as on the input and output of the individual processors 432, 434. Additional registers may be placed at the inputs and/or outputs of the output crossbar 402.

The input crossbar 404 may be dynamically controlled, such as described above, or may be statically configured, such as by writing data values to configuration registers during a setup operation, for instance.

An output crossbar 402 can connect any of the outputs of the processors 432, 434, or the communication channel from the memory unit 240 as either an intermediate or a local output of the processing unit 230. In the illustrated embodiment the output crossbar 402 is statically configured during the setup stage, although dynamic (or programmatic) configuration would be possible by adding appropriate output control from the processors 432, 434. The combination of the input crossbar 404 and the output crossbar 402 is referred to as the programmable interconnect 408.

Figure 9:
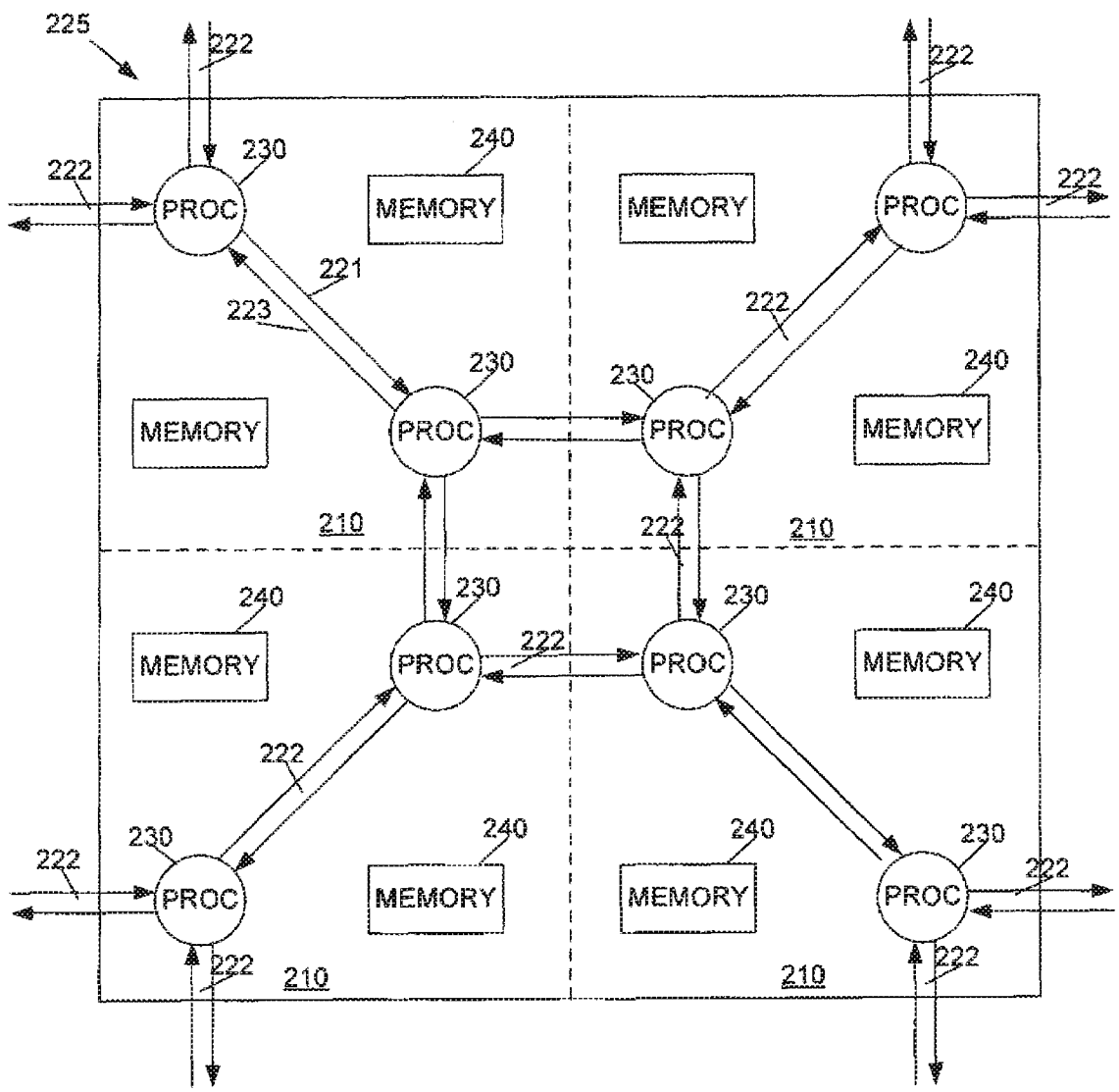
FIG. 9 is a block diagram illustrating a local computing network that connects various processing units according to embodiments of the invention.

FIG. 9 illustrates a local communication system 225 between processing units 230 within an example tile 210 of the platform 100 according to embodiments of the invention. The compute and memory units 230, 240 of FIG. 9 are situated as they were in FIG. 2, although only the communication system 225 between the processing units 230 is illustrated in FIG. 9. Additionally, in FIG. 9, data communication lines 222 are illustrated as a pair of individual unidirectional communication paths 221, 223, running in opposite directions.

In this example, each processing unit 230 includes a horizontal network connection, a vertical network connection, and a diagonal network connection. The network that connects one processing unit 230 (and not the memory units 240) to another is referred to as the local communication system 225, regardless of its orientation and which processing units 230 it couples to. Further, the local communication system 225 may be a serial or a parallel network, although certain time efficiencies are gained from it being implemented in parallel. Because of its character in connecting only adjacent processing units 230, the local communication system 225 may be referred to as the 'local' network. In this embodiment, as shown, the communication system 225 does not connect to the memory modules 240, but could be implemented to do so, if desired. Instead, an alternate implementation is to have the memory modules 240 communicate on a separate memory communication network (not shown).

The local communication system 225 can take output from one of the processors 432, 434 within a processing unit 230 and transmit it directly to another processor in another processing unit to which it is connected. As described with reference to FIG. 3, the local communication system 225 may include one or more sets of storage registers (not shown), such as the protocol register 300 of FIG. 3, to store the data during the communication. In some embodiments, registers on the same local communication system 225 may cross clock boundaries and therefore may include clock-crossing logic and lockup latches to ensure proper data transmission between the processing units 230.

Figure 10:
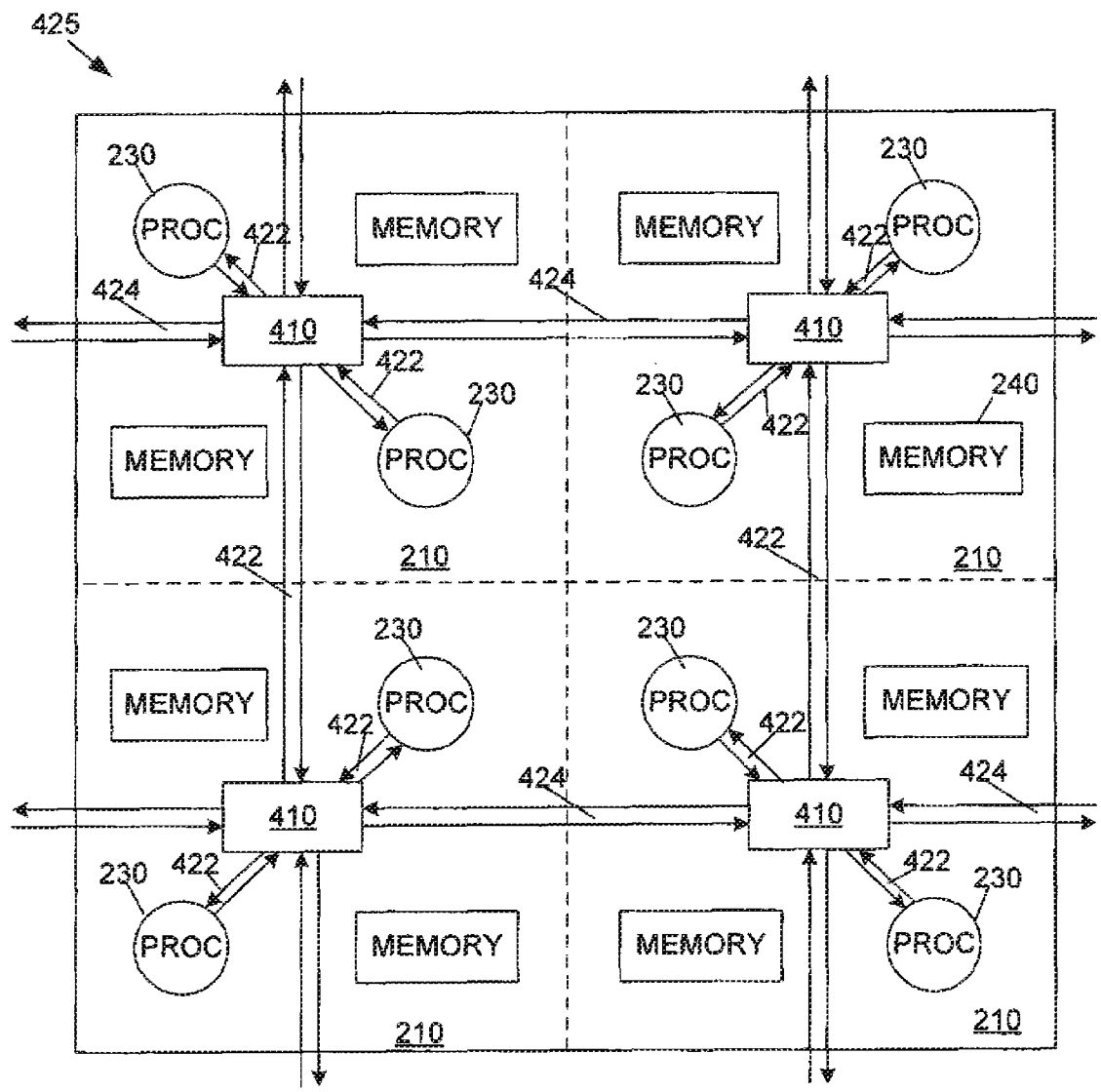
FIG. 10 is a block diagram illustrating a second computing network that connects various processing units according to embodiments of the invention.
Figure 11:
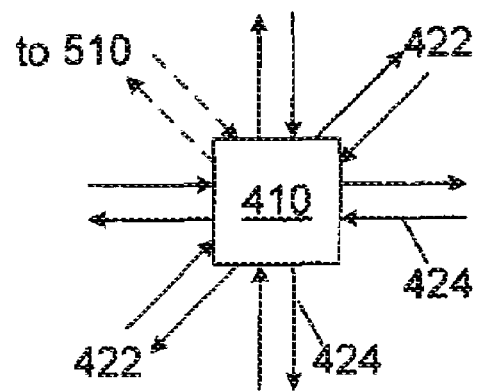
FIGS. 11 and 12 are block diagrams illustrating various connections into communication switches according to embodiments of the invention.

FIG. 10 illustrates another communication system 425 within the platform 100, which can be thought of as another level of communication within an integrated circuit. The communication system 425 is an 'intermediate' distance network and includes switches 410, communication lines 422 to processing units 230, and communication lines 424 between switches themselves. As above, the communication lines 422, 424 can be made from a pair of unidirectional communication paths running in opposite directions. In this embodiment, as shown, the communication system 425 does not connect to the memory modules 240, but could be implemented in such a way, if desired.

In FIG. 6, one switch 410 is included per tile 210, and is connected to other switches in the same or neighboring tiles in the north, south, east, and west directions. The switch 410 may instead couple to an Input/Output block 114 (FIG. 1). Thus, in this example, the distance between the switches 410 is equivalent to the distance across a tile 210, although other distances and connection topologies can be implemented without deviating from the scope of the invention.

In operation, any processing unit 230 can be coupled to and can communicate with any other processing unit 230 on any of the tiles 210 by routing through the correct series of switches 410 and communication lines 422, 424, as well as through the communication network 425 of FIG. 9. For instance, to send communication from the processing unit 230 in the lower left hand corner of FIG. 10 to the processing unit 230 in the upper right corner of FIG. 10, three switches 410 (the lower left, upper right, and one of the possible two switches in between) could be configured in a circuit switched manner to connect the processing units 230 together. The same communication channels could operate as a packet switching network as well, using addresses for the processors 230 and including routing tables in the switches 410, for example.

Figure 12:
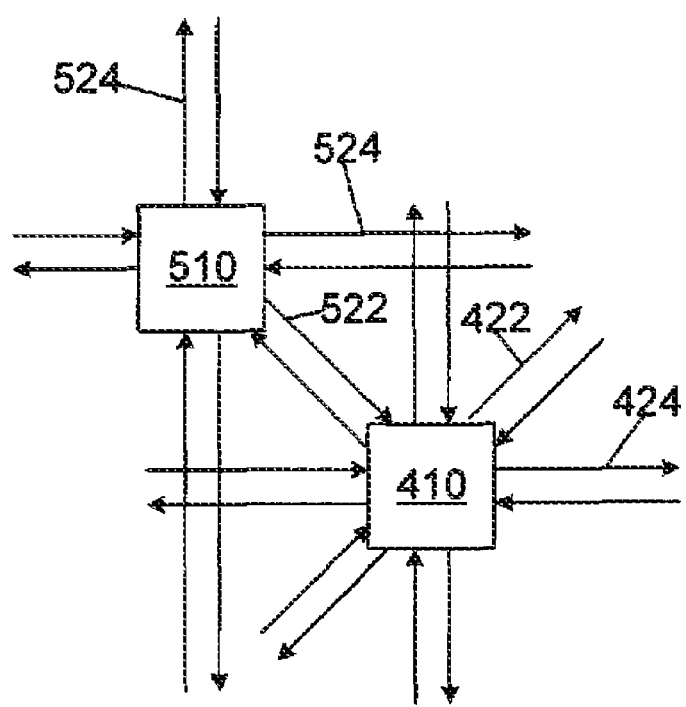

Also as illustrated in FIGS. 11, 12, 13, and 14 some switches 410 may be connected to yet a further communication system 525, which may be referred to as a 'distance' network. In the example system illustrated in these figures, the communication system 525 includes switches 510 that are spaced apart twice as far in each direction as the communication system 425, although this is given only as an example and other distances and topologies are possible. The switches 510 in the communication system 525 connect to other switches 510 in the north, south, east, and west directions through communication lines 524, and connect to a switch 410 (in the intermediate communication system 425) through a local connection 522 (FIG. 12).

Figure 13:
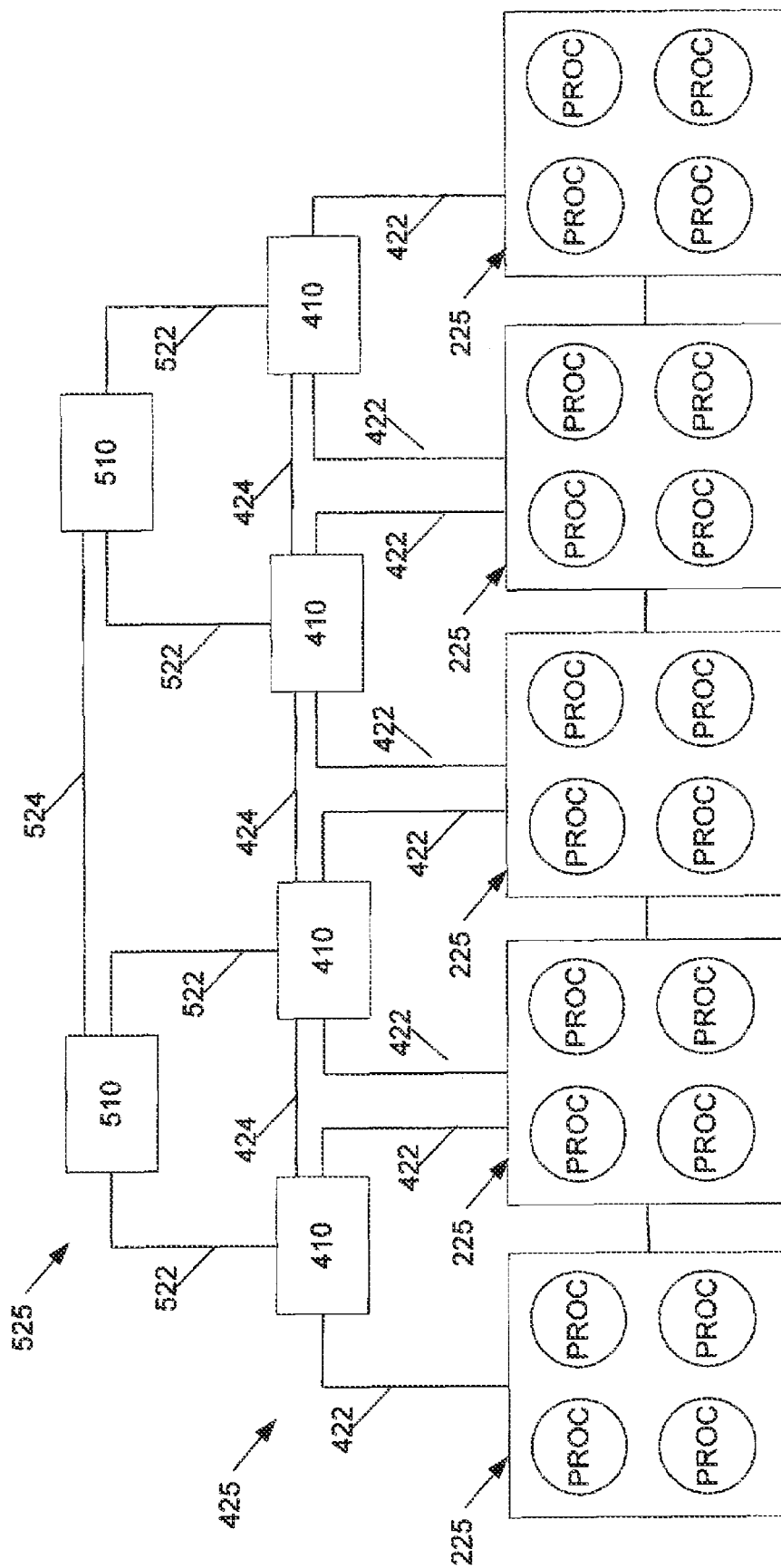
FIG. 13 is a block diagram illustrating a hierarchical communication network for an array of computing resources according to embodiments of the invention.

FIG. 13 is a block diagram of hierarchical network in a single direction, for ease of explanation. At the lowest level illustrated in FIG. 13 groups of processors communicate within each group and between nearest groups of processors by the communication system 225, as was described with reference to FIG. 9. The local communication system 225 is coupled to the communication system 425 (FIG. 10) which includes the intermediate switches 410. Each of the intermediate switches 410 couples between groups of local communication systems 225, allowing data transfer from a processing unit 230 (FIG. 2) to another processing unit 230 to which it is not directly connected through the local communication system 225.

Further, the intermediate communication system 425 is coupled to the communication system 525 (FIG. 13), which includes the switches 510. In this example embodiment, each of the switches 510 couples between groups of intermediate communication systems 425.

Having such a hierarchical data communication system, including local, intermediate, and distance networks, allows for each element within the platform 100 (FIG. 1) to communicate to any other element with fewer 'hops' between elements when compared to a flat network where only nearest neighbors are connected.

The communication networks 225, 425, and 525 are illustrated in only 1 dimension in FIG. 13, for ease of explanation. Typically the communication networks are implemented in two-dimensional arrays, connecting elements throughout the platform 100.

Figure 14:
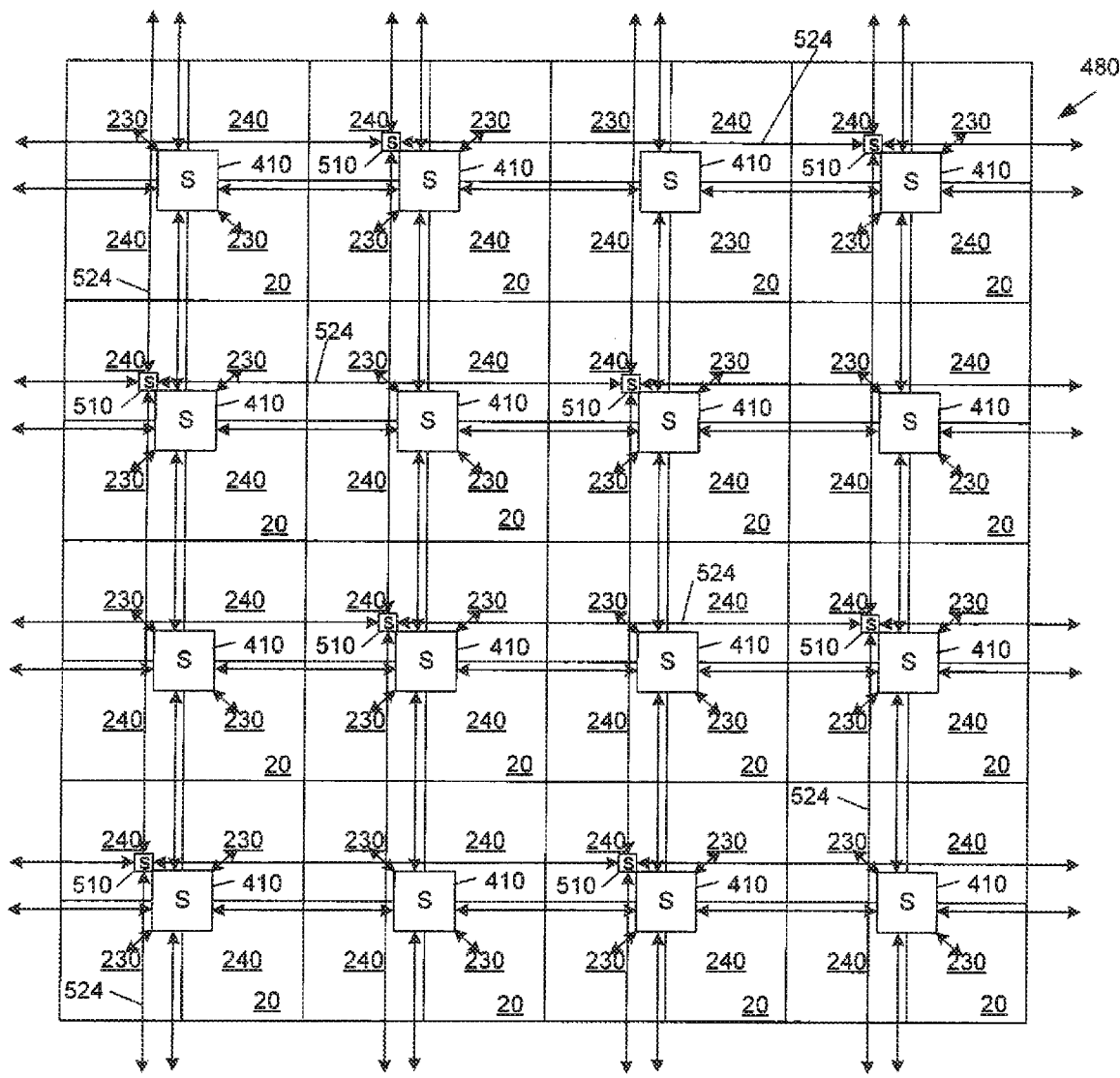
FIG. 14 is a block diagram of multiple communication systems within a portion of an integrated circuit according to embodiments of the invention.

FIG. 14 is a block diagram of a two-dimensional array illustrating sixteen tiles 210 assembled in a 4×4 pattern as a portion of an integrated circuit 480. Within the integrated circuit 480 of FIG. 14 are the three communication systems, local 225, intermediate 425, and distance 525 explained previously.

The switch 410 in every other tile 210 (in each direction) is coupled to a switch 510 in the long-distance network 525. In the embodiment illustrated in FIG. 14, there are two long distance networks 525, which do not intersect one another. Of course, how many of each type of communication networks 225, 425, and 525 is an implementation design choice. As described below, switches 410 and 510 can be of similar or identical construction.

In operation, processing units 230 communicate to each other over any of the networks 225, 425, 525 described above. For instance, if the processing units 230 are directly connected by a local communication network 225 (FIG. 9), then the most direct connection is over such a network. If instead the processing units 230 are located some distance away from each other, or are otherwise not directly connected by a local communication network 225, then communicating through the intermediate communication network 425 (FIG. 10) may be the most efficient. In such a communication network 425, switches 410 are programmed to connect output from the sending processing unit 230 to an input of a receiving processor unit 230, an example of which is described below. Data may travel over communication lines 422 and 424 (FIG. 10) in such a network, and could be switched back down into the local communication network 225 through the switch 410. Finally, in those situations where a receiving processing unit 230 is a relatively far distance from the sending processing unit 230, the distance network 525 of FIGS. 12 and 14 may be used. In such a distance network 525, data from the sending processing unit 230 would first move from its local network 225 through an intermediate switch 410 and further to one of the distance switches 510. Data is routed through the distance network 525 to the switch 510 closest to the destination processing unit 230. From the distance switch 510, the data is transferred through another intermediate switch 410 on the intermediate network 425 directly to the destination processing unit 230. Any or all of the communication lines between these components may include conventional, programmable, and/or shared data channels as best fits the purpose. Further, the communication lines within the components may have protocol registers 300 of FIG. 3 inserted anywhere between them without affecting the data routing in any way.

Figure 15:
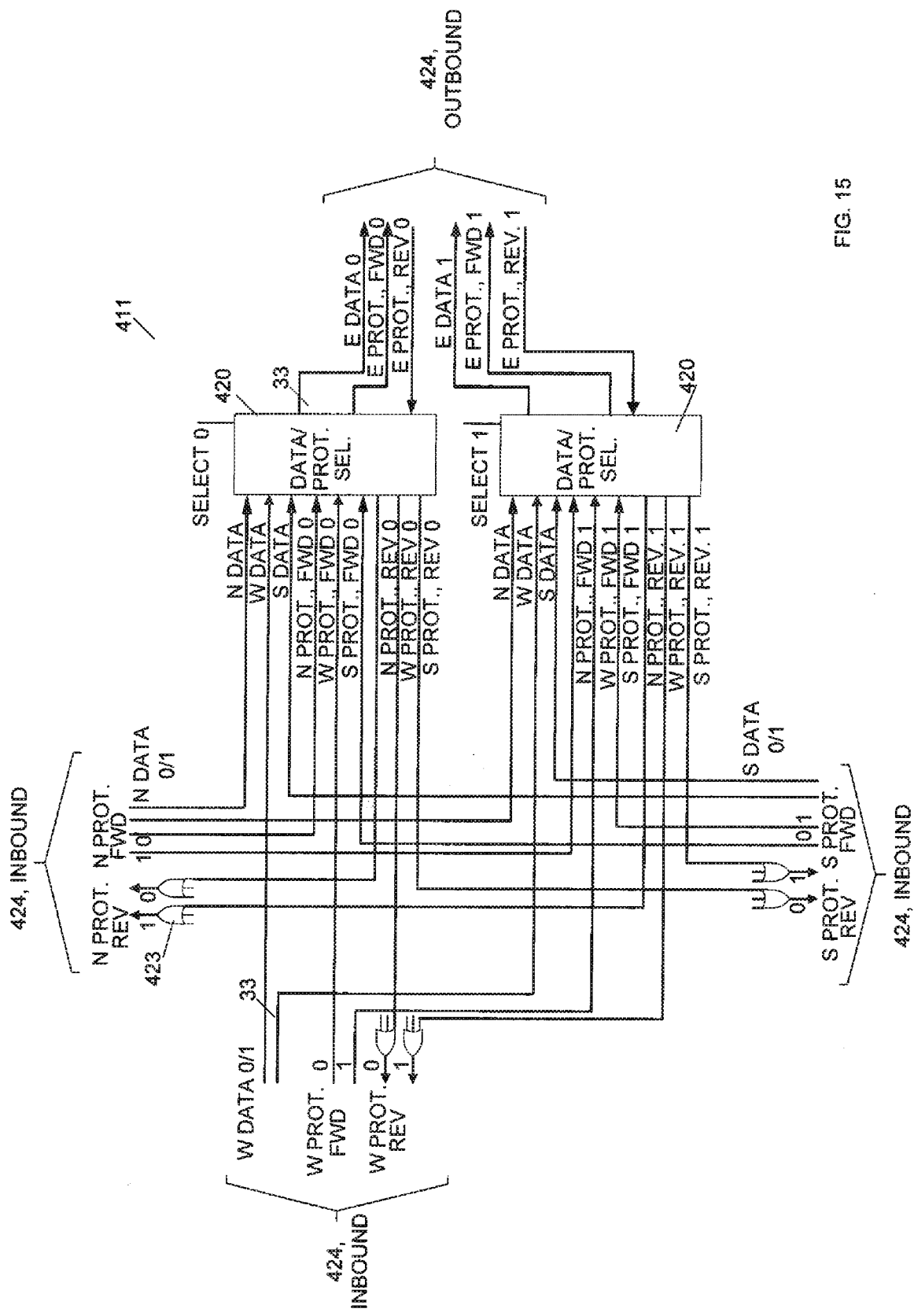
FIG. 15 is a block diagram of an example portion of an example switch of a communication network illustrated in FIG. 14 according to embodiments of the invention.

FIG. 15 is a block diagram illustrating a portion of an example switch structure 411. For clarity, only a portion of a full switch 410 of FIG. 10 is shown, as will be described. Generally, various lines and apparatus in the East direction illustrate components that make up output circuitry, only, including communication lines 424 in the outbound direction, while the North, South, and West directions illustrate inbound communication lines 424, only. Of course, even in the "outbound" direction, which describes the direction of the main data travel, there are input lines, as illustrated, which carry reverse protocol information for the protocol registers 300 of FIG. 3. Similarly, in the "inbound" direction, reverse protocol information is an output. To create an entire switch 410 (FIG. 10), the components illustrated in FIG. 15 are duplicated three times, for the North, South, and West directions, as well as extra directions for connecting to the local communication network 225. In this example, each direction includes a pair of data and protocol lines, in each direction.

A pair of data/protocol selectors 420 can be structured to select one of three possible inputs, North, South, or West as an output. Each selector 420 operates on a single channel, either channel 0 or channel 1 from the inbound communication lines 424. Each selector 420 includes a selector input to control which input, channel 0 or channel 1, is coupled to its outputs. The selector 420 input can be static or dynamic. Each selector 420 operates independently, i.e., the selector 420 for channel 0 may select a particular direction, such as North, while the selector 420 for channel 1 may select another direction, such as West. In other embodiments, the selectors 420 could be configured to make selections from any of the channels, such as a single selector 420 sending outputs from both West channel 1 and West channel 0 as its output, but such a set of selectors 420 would be larger, slower, and use more power than the one described above.

Protocol lines of the communication lines 424, in both the forward and reverse directions are also routed to the appropriate selector 420. In other embodiments, such as a packet switched network, a separate hardware device or process (not shown) could inspect the forward protocol lines of the inbound lines 424 and route the data portion of the inbound lines 424 based on the inspection. The reverse protocol information between the selectors 420 and the inbound communication lines 424 are grouped through a logic gate, such as an OR gate 423 within the switch 411. Other inputs to the OR gate 423 would include the reverse protocol information from the selectors 420 in the West and South directions. Recall that, relative to an input communication line 424, the reverse protocol information travels out of the switch 411, and is coupled to the component that is sending input to the switch 411.

The version of the switch portion 411 illustrated in FIG. 15 has only communication lines 424 to it, which connect to other switches 410, and does not include communication lines 422, which connect to the processing units 230. A version of the switch 410 that includes communication lines 422 connected to it is described below.

Switches 510 of the distance network 525 may be implemented either as identical to the switches 410, or may be more simple, with a single data channel in each direction.

Figure 16:
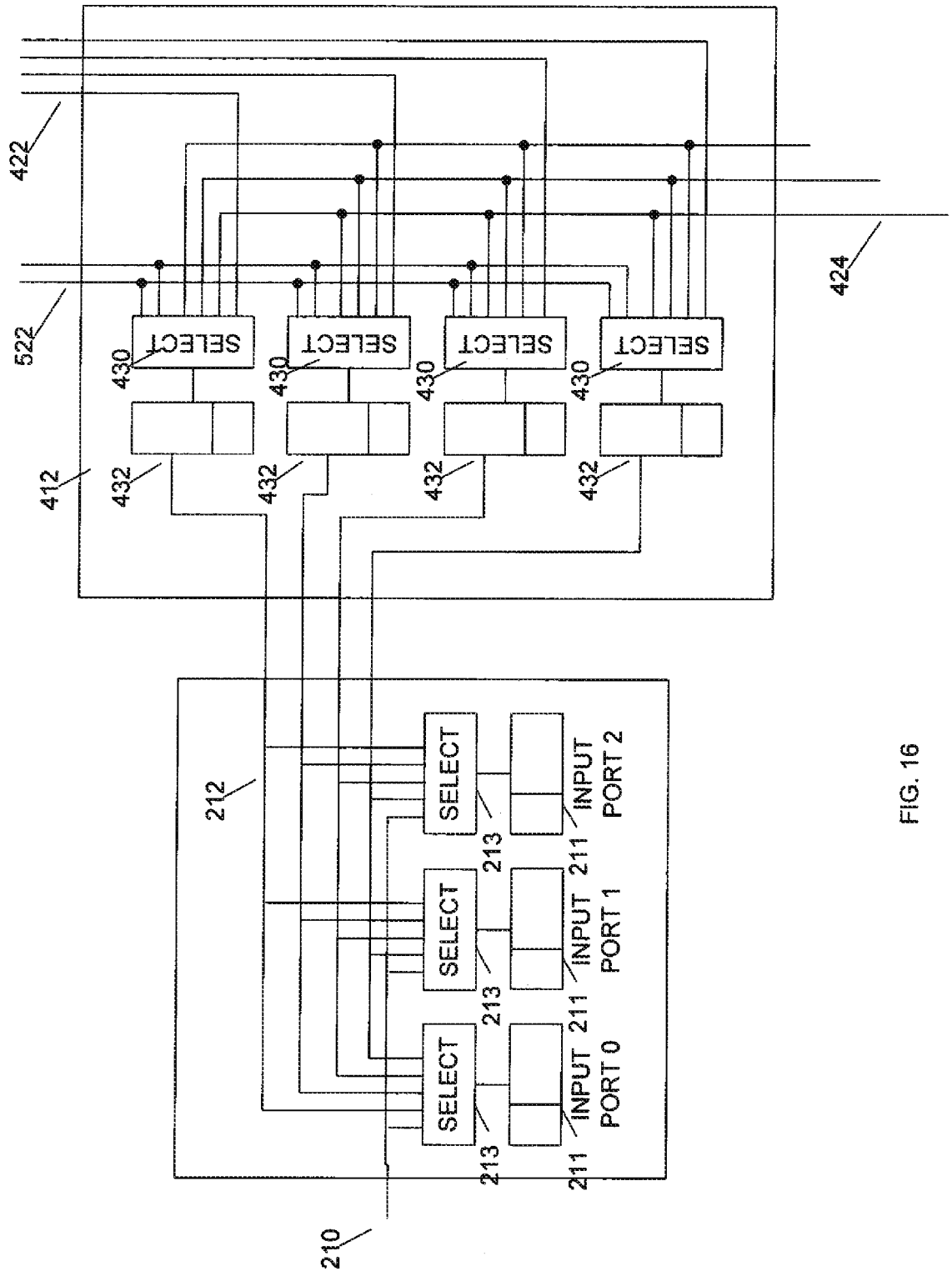
FIG. 16 is a block diagram of an example of programmable interface between a portion of a network switch of FIG. 15 and input ports of an electronic component in the platform of FIG. 1 according to embodiments of the invention.

FIG. 16 is a block diagram of a switch portion 412 of an example switch 410 (FIG. 6) connected to a portion 212 of an example processor in a processing unit 230. The processor portion 212 in FIG. 16 includes three input ports, 0, 1, 2. The switch 412 of FIG. 16 includes four programmable selectors 430, which operate similar to the selectors 420 of FIG. 15. By making appropriate selections, any of the communication lines 422, 424 (FIG. 10), or 418 (described below) that are coupled to the selectors 430 can be coupled to any of the output ports 432 of the switch 412. The output ports 432 of the switch 412 may be coupled through another set of selectors 213 to a set of input ports 211 in the processor portion 212. The selectors 213 can be programmed to set which output port 440 from the switch 412 is connected to the particular input port 211 of the processor portion 212. Further, as illustrated in FIG. 16, the selectors 213 may also be coupled to a communication line 210' which is internal to the processor in the processing unit 230, for selection into the input port 211.

One example of an example connection between the switches 410 and 510 is illustrated in FIG. 16. In that figure, the communication lines 522 couple directly to the selectors 430 from one of the switches 510. Because of the how switches 410 couple to switches 510, each of the two long distance networks within the circuit 440 illustrated in FIG. 14 is separate. Data can be routed from a switch 510 to a switch 510 on a parallel distance network 525 by routing through one of the intermediate distance network switches 410.

The following description illustrates example systems and methods to configure the processor array platform 100 through the various communication networks described above. Efficiency and flexibility are maintained by configuring the platform 100 by using the processors, memories and channels of the platform 100 themselves, without additional configuration circuitry. Specifically, individual processors are configured after startup by sending configuration instructions and data over the existing communication network 225. A major or minor processor 432, 434 can load data from a communication channel into its entire local memory 514 by executing loader code from another or the same communication channel. Memories 460 are loaded and registers in the memory engines 474 can be configured by writing data packets sent by processors over channels 462 under the control of write instructions sent over the same channels. Channels 436 between processors 432, 434 (FIG. 4) are connected dynamically by setting the switches 404 during transmission by write instructions from the major or minor processors 432, 434. Little data is necessary to configure neighbor channel programmable processor crossbars 408, and the distant channel switches 510 configuration state is small.

In some embodiments, a minor processor 432 can randomly access and configure the crossbars 408 across its tessellated row or column, through a configuration channel, which in one embodiment is a dedicated bit-serial channel that never halts.

Configuration is the first program that runs on the chip after a power-cycle startup or reset. Setting up the configuration program is inherently recursive, based on building daisy chains of the minor processors 432.

Figure 17:
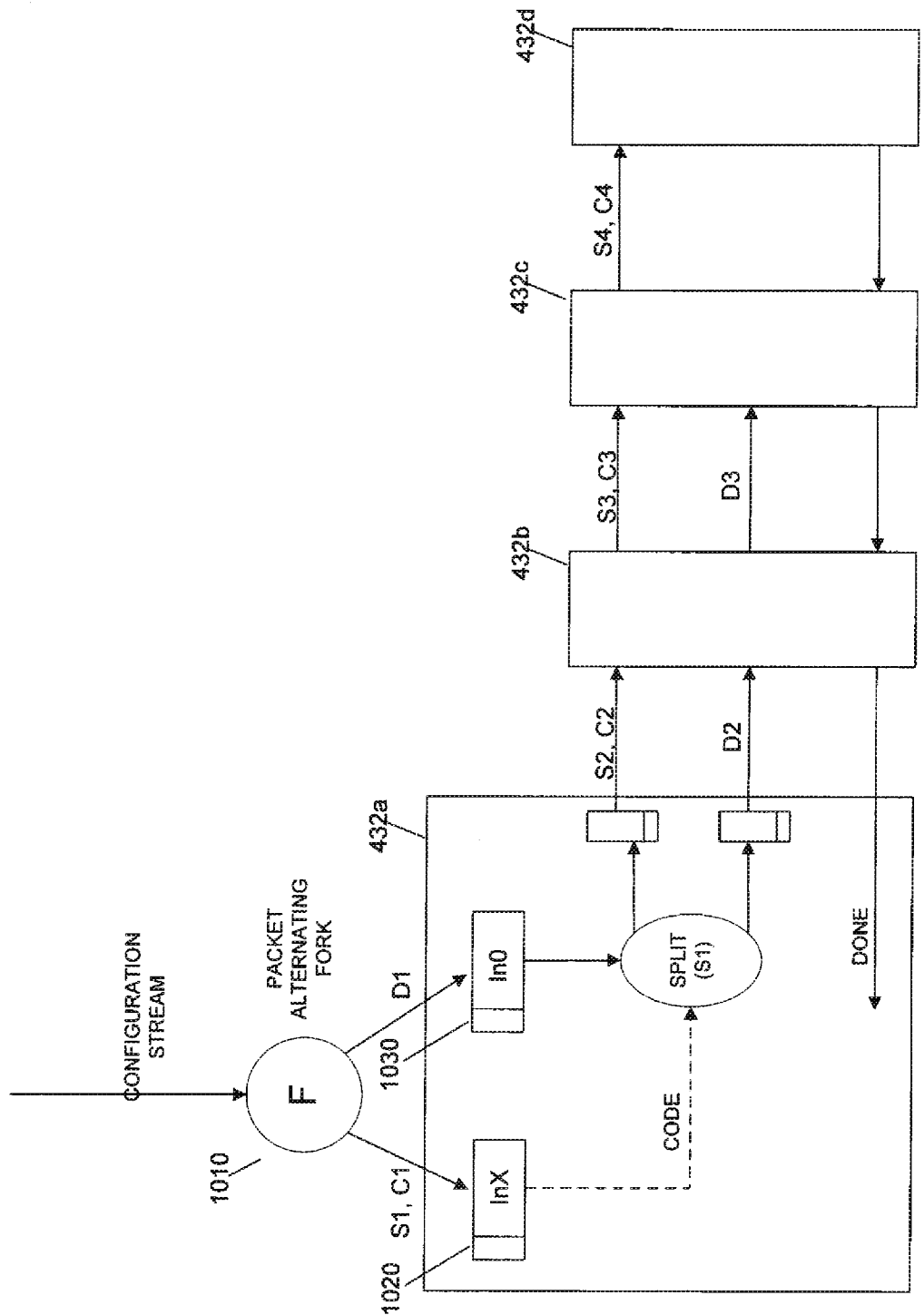
FIG. 17 is a block diagram illustrating an example configuration stream according to embodiments of the invention.

As illustrated in FIG. 17, a chain of minor processors 432, connected by communication channel pairs, is configured incrementally by a recursively structured configuration stream. A mixture of code and data is sent down the communication chain, into processors 432, and the code is executed to configure their targets. The communication chain's processors execute instructions embedded in the data streaming across the communication channels. Some instructions configure the registers in the programmable crossbars 408 in the receiving network as it finishes, so that the network is ready for the application to execute. As the configuration stream finishes, only the state it changed remains—all the streaming data has either been consumed or passed on.

There are various ways to construct a configuration chain to configure the processors, in one embodiment, the minor processor 432 that first accepts the configuration stream comes out of a reset state in an accepting mode (i.e., its accept bit of the protocol register 300 is asserted) and in a mode to automatically execute instructions (i.e., operating in execute-from-channel mode as described above). The instructions in the configuration stream come from outside of the platform 100. The configuration stream may be stored in some memory, for example an EEPROM chip (not illustrate), or may be the output of a configuration program also originating outside of the platform 100. In some embodiments, the platform 100 may include special local memory for pre-storing the configuration. The first processor 432 in each remaining row of tiles 210 comes out of the reset state accepting instructions on a channel from the processor group 230 above. The first processors 432 in all rows configure channels in the static interconnect 408 (FIG. 8) to form a daisy chain through the entire processor array platform 100. This first processor 432 configures channels in the static interconnect 408 between the processor groups 230 across its row, as shown in the small four processor chain in FIG. 17.

After configuring the chain's channels in the static interconnect 408, through the first processor 432, the incoming configuration stream continues with recursively structured code and data for each of the chain's processors 432. The first processor 432 in the first row accepts this stream through a hardware packet-alternating fork 1010 which routes data packets alternately to its instruction input InX 1020 and data input In0 1030. With reference to the processor 500 illustrated in FIG. 5, the input Inx 1020 of FIG. 17 may be embodied by the input channel 502, while the data input 1030 of FIG. 17 may be embodied by the input channel 522.

The flexible nature of the communication networks within the platform 100 allows great flexibility in setting up the configuration chains of the processors within the platform. In some embodiments, the configuration chain may be set to program groups of processors that are arranged in one or more horizontal rows. In other embodiments, the configuration chains may be established across one or more vertical columns. In still other embodiments, the configuration chains may be established in a combination of vertical and horizontal orientations. The specific examples given here are enabling examples, but embodiments of the invention are not limited to the examples described herein. To the contrary, the extreme flexibility of the platform 100 provides dozens or hundreds of ways to create a configuration chain. The final decision of how to set up the configuration chain is likely implementation specific, but, in any event, the process is the same or similar in configuring the platform 100.

Figure 18:
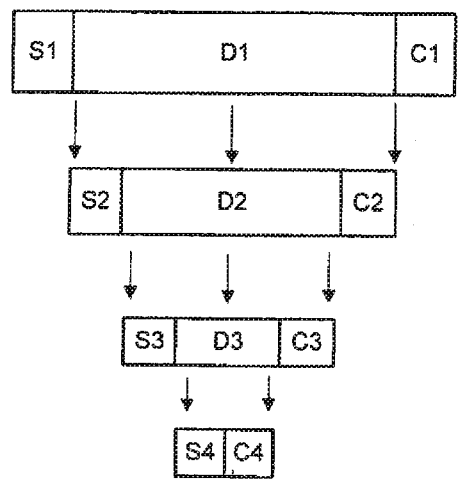
FIG. 18 is a block diagram illustrating contents of a recursive configuration stream according to embodiments of the invention.

The configuration stream, illustrated in FIG. 18 has a recursive structure. It this example, the configuration stream includes three packets: Split code (S1), Data (D1), and Configuration code (C1). The first processor 432a (FIG. 17) accepts its Split code S1 from the fork's instruction channel 1020. In executing that code, the first processor 432a accepts D1 through a data input 1030 (the fork flipped) and splits D1 into a code packet S2, C2 and a data packet D2 for the second processor 432b.

Ultimately, a data packet containing only Split code and Configuration code, but no other data code (S4,C4 in this example) arrives at the last processor 432d in the chain. The last processor 432d now runs its configuration code in channel execution mode. This configuration code can completely configure associated processors and memories, with application instruction and data inline, encoded as load-literal instructions. Then the next-to-last processor 432c runs its configuration code (C3 in this case), and so on back to the first processor 432a.

The first processors 432a in each row comes out of reset linked for channel execution of a configuration stream from an off-chip source through an interface such as PCI Express, serial flash ROM, JTAG, a microprocessor bus, or an instruction stream retrieved from an external memory. The first portion of the configuration stream is executed by these processors 432a-432d to configure the interconnect 408 into a configuration daisy chain through the entire processor array platform 100. Then the configuration chain processes the remainder of the stream to configure the application as follows.

Figure 19:
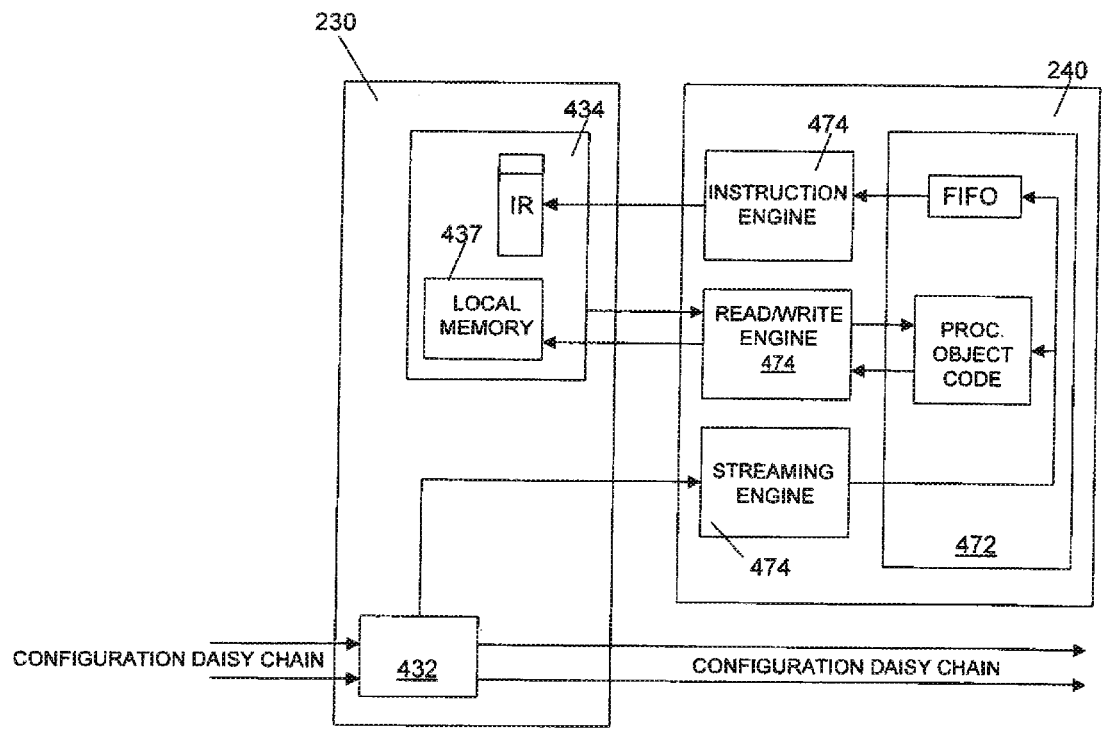
FIG. 19 is a block diagram of illustrating configuration paths and locations within a portion of a group of processors and memory of FIG. 2 according to embodiments of the invention.

Memory engines 474 of FIG. 5 also start in an accepting mode, which can configure all memory engines 474 in an associated memory 240 (FIG. 19). The configuration chain includes a channel from the processor 432 into a streaming engine 474 (FIG. 19) for configuring the memory 240. It passes data packets from the configuration stream to one of the engines 474 to load and configure the memory 240. Initially, the memory 240 is used to configure major processors 434, then it is configured itself for the application.

Each major processor 434 comes out of reset executing from a channel fed by the instruction engine 474 of its associated memory 240, initially stopped. A configuration packet loads object code of the processor 434 code into a temporary buffer in RAM 472, as illustrated in FIG. 19. Another packet configures memory engines 474, setting up a temporary FIFO that feeds the instruction engine of the processor 434, and turning it on. Finally a packet feeds processor 434 instructions into that FIFO, which the processor 434 executes to fill its local memory 437 with its object's code from the memory 240 buffer, and otherwise become initialized.

The application object's initialization code may run as part of configuration, and need not use up space in the local memory 437. The major processor 434 is left stalled on a lock bit in its processing unit 230, to be cleared when all configuration is finished, followed by a jump to execute its object code from the local memory 437. Both major processors 434 in a processing unit 230 can be configured this way.

To configure the memory 460 for an application, configuration packets sent through the configuration chain from the minor processor 432 load any memory 460 objects' initial data into the RAM 472, and set up the memory engines 474.

I/O interfaces (114, FIG. 1) may receive configuration packets through neighbor channels from nearby configuration chains.

Each chain minor processor 432 is one of two in its processing unit 230. The instructions for minor processor 432 from the configuration stream are sent to an instruction input in the non-chain minor processor 432, which executes a loop copying its object's code from the configuration stream into its own local memory, does any other initialization, and stalls on a lock bit before starting its object's execution.

Finally, the configuration chain minor processor 432 does the same thing for itself. Before stalling on the lock bit in the processing unit 230, the last minor processor 432*d* in the chain sends a "configuration complete" token back through a return channel shown in FIG. 17. Each minor processor 432 passes the configuration complete token on when it is finished, so when the configuration complete token reaches the first minor processor 432*a* in the configuration chain, all of the associated processors 432, 434 and their associated memories are complete.

Then the first minor processor 432*a* configures the static interconnect 408 for the application, overwriting the chain's interconnect configuration. A minor processor 432 that configures static interconnect 408 is earlier in the chain than the other chain processors 432 in the tiles 210 it configures. By doing this last, starting from the far end, each minor processor 432 configuring the application's static interconnect no longer needs the chain downstream from it.

Finally each chain's first minor processor 432*a* executes the last of its configuration code, which releases the lock bits in each of the processing units 230, which allows the processors 432, 434 to begin the application execution.

The size of a configuration stream depends on the size of its application, of course. It includes the local memories in the processors 432, 434, the memory engine 474 and static interconnect configurations 408, any instructions in the memories 240, and any initial data in processors 432, 434 and memories 240. Most applications will not fill all processor local memories 514 and memories 240, so they will load quickly.

A configuration daisy chain could have a decompression object at its head. For example, a gzip-like decompressor (LZ77 and Huffman), which runs in one processing unit 230 and adjacent memory 240, could accept a compressed execution stream, decompress the stream, and deliver the uncompressed stream to subsequent processors. Using a compressed configuration chain could allow loading from a smaller memory than for an uncompressed stream.

Embodiments of the invention are also directed to re-configuration of the processing platform 100 while it is already operating—referred to here as runtime-configuration.

Since initial configuration is itself a configured application, reconfiguring parts of an application at runtime is similar to the initial configuration described above. Assuming there are several communication channels and processors available for the reconfiguration, the reconfiguration can be relatively fast. Since objects running on the processors 432, 434 in the processing unit 230 are independent and encapsulated, reconfiguration can happen while other parts of an application continue to run normally.

A reconfigurable composite object (RCO) is a set of member composite objects (MCO), which all connect with and use the same set of input and output communication channels in a consistent way, may share internal state, and are placed and routed to a common region of processor groups 230 and memory 240 in the core. If necessary, an MCO may be written to accept a command to shut itself down in an orderly way.

An RCO also includes a persistent configurator object, which receives reconfiguration requests from inside or outside the RCO over communication channels programmed into the application. To start reconfiguration, the RCO signals the member object currently running to shut down.

The configurator is connected to one or more on-chip memories 240 and/or off-chip memory, such as an SDRAM or EEPROM, where MCO configuration streams are loaded at an initial configuration. The configurator sends a read request packet to the SDRAM for the new object's configuration stream. The configurator then processes the beginning of the stream to construct a configuration daisy chain by setting the programmable interconnect 408 in the processing units 230 in the region of the RCO. Then the RCO deploys a configuration stream down the chain.

To minimize reconfiguration overhead time, load-literal inline coding of instructions and data, which may have a cycle penalty, need not be used. Instead, the configuration code of the minor processors 432 just loads a program into its local memory 240, for memory execution.

After the recursively structured configuration stream completes, it is followed by a series of data packets, containing the new MCO's instructions, data and configuration. These packets are sent down the previously set up configuration chain. Each minor processor 432 passes packets for its major processors 434 and memory 240 onto a memory streaming engine 474 at a full clock data rate, using a packet-copy instruction that transfers one word per cycle. Next it starts a loop in the other minor processor 432 of the processing unit 230 that receives its local memory contents at full rate. Finally the minor processor 432 returns to channel execution to run a similar loop configuring itself. Then the minor processor 432 sends or passes a done token, and stalls on the lock bit.

The configurator tears down the daisy chain's channels (i.e. re-sets the programmable interconnect 408) and configures the new MCO's interconnect.

Figure 20:
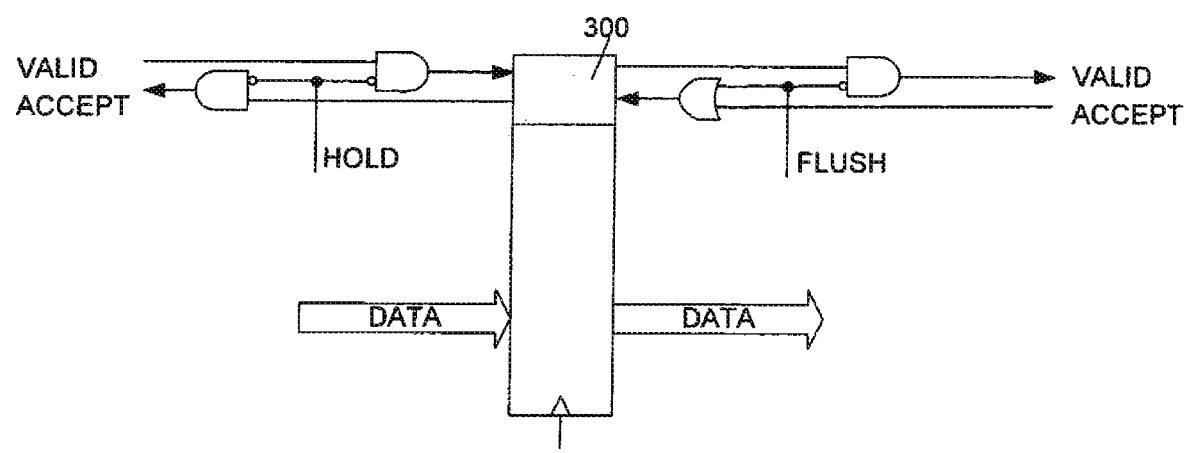
FIG. 20 is a block diagram of a data/protocol register of FIG. 3 having flush and hold controls.

Communication channels are managed through reconfiguration, emptying them of old data and preventing acceptance of new data. Input and output registers of processing units 230 have flush and hold controls added to a data/protocol register 300, as illustrated in FIG. 20. A flush signal affects the output side of a register 300, de-asserting the valid output of the register while asserting the accept input. This combination empties the register 300 and registers that are upstream in its communication channel, unless its hold control is also asserted. A hold signal affects the input side of a register 300, de-asserting both the valid input and the accept output, which prevents the register 300 from accepting further input. The flush and hold control signals, as well as the lock bit, may all be set before reconfiguring a processing unit 230. Alternately, the hold control may be selectively set, on the old MCO inputs only, which lets registers with flush controls empty their communication channels even if upstream registers lack flush controls. The flush and hold controls are released (re-set) on communication channels while the channels are used for reconfiguration. The configurator releases flush, hold and the lock bits at the conclusion of the runtime reconfiguration to start the RCO's newly configured MCO.

When an RCO shuts down before reconfiguration, its input and output channels stall. Hold and flush signals keep those channels stalled during the reconfiguration. Objects from outside the RCO upstream and downstream simply stall on those halted communication channels, and then re-continue normally after the newly reconfigured RCO begins running. No special programming outside the RCO is needed. The RCO is encapsulated and behaves like any normal object, because of a structured object programming model used to program the platform 100.

RCO reconfiguration may be selective, according to the contents of the configuration code, which may, for example, leave certain RAM 472 contents undisturbed, to be available to the newly configured member composite object. The RCO may reconfigure any number of processors 432, 434 within the platform 100.

In some embodiments, runtime reconfiguration streams for RCOs may be loaded into an SDRAM at an initial configuration time of the platform 100, and be randomly accessed by RCO controllers, with very short latency, on the order of sub-microseconds.

Alternate techniques for runtime reconfiguration are possible in platform 100. In another technique, an RCO's processor local memories 514 each hold a small number of instructions, called a kernel, that remain persistent through all reconfigurations. Persistently configured kernel communication channels link all the processors in an RCO so that their kernels may inter-communicate.

An object in a MCO, called the input object, may receive a reconfiguration message on one of its communication channels. When it receives such a signal, the object passes control to its processor's kernel, which sends a "reconfigure" control token to the other kernels through the kernel communication channels. The input object's kernel is called the input kernel, the channel it is receiving input on is called the input channel. All objects in the MCO pass control to their kernels from time to time, to see if such a token has arrived, and pass it on if necessary. If not, the kernel returns control to its object code.

The reconfiguration message is followed by reconfiguration data for the new MCO, which could come from any source available on the platform 100. It may all be in the form of one or more message packets, defined by packet_id values stored in register sections 308.

The first stage of reconfiguration is to empty any internal communication channels of the previous MCO, to ensure that no data remains in registers used by communication channels in the new MCO.

Every MCO is written so that it regularly returns to a condition where all its objects have completed some unit of work, such that all communication channels between processor objects are empty. One example of this operation is when an MCO's input data comes in the form of defined units of work, such as message packets, and an MCO's internal communications among its objects are also in similarly defined form. When each object has finished a unit of work, it returns to its kernel. Thus the channels between processors are empty when all kernels have control. Memory engine and input/output communication channels remain to be cleared of data.

Memory engines 474 are shut down first, to keep them from sending any more output on communication channels. Each major processor kernel receiving the "reconfigure" token does this by writing to engine configuration registers, before passing the token on.

Next, the input kernel sets the hold input on the input communication channel it is receiving the reconfiguration message on, thereby protecting the rest of it. Then it asserts a flush signal on all processing unit 232 input and output registers in the RCO, emptying internal communication channels. After enough cycles to ensure completion, it releases the flush and then releases the hold.

Having cleared internal communication channels, the second stage of reconfiguration is to configure the new MCO. The processing unit 232 output crossbars 402 are configured first by the input kernel, using commands and data it receives from the reconfiguration message, through the same configuration channels used to configure them originally.

Then the input kernel reconfigures its own processor, by loading instructions from the reconfiguration message into its own local memory 514. It sends the remaining processor configuration data from the reconfiguration message into the kernel communication channel. The next kernel receives that and reconfigures itself, sends the remainder on, and so forth. Channels between processors within a processing unit 232, controlled by input crossbar 404, are dynamically interconnected by setting them during execution by instructions from the processors.

After receiving all the processor configuration data, the input kernel sends the memory 460 configuration data from the reconfiguration message into the kernel communication channels. Kernels use this data to configure engines 474, and then write instructions and data into RAMs 472.

Now the RCO's new MCO has been configured. When the input kernel receives input data, it sends "start" tokens on the kernel communication channels, and begins executing its own object code. When other kernels receive "start" tokens, they also begin executing their object code.

Implementation of the described system is straightforward to produce in light of the above disclosure. As always, implementation details are left to the system designer. Individual selection of particular configuration details, registers, and objects, message formats, etc., are implementation specific and will depend on the system implementation.

Thus, although particular embodiments for a configuration system has been discussed, it is not intended that such specific references be considered limitations on the scope of this invention, but rather the scope is determined by the following claims and their equivalents.

What is claimed is:

1. A system for reconfiguring elements in a multi-element processor array, comprising:
a series of processors;
a programmable connection network linking the series of processors by communication channels;
a reconfiguration operator operable on a first processor and structured to receive a reconfiguration command and retrieve a reconfiguration stream;
a configuration stream operator structured to parse the reconfiguration stream into a local component and components for subsequent processors; and
a network reconfigurator operable on the first processor and structured to use a portion of the local component to program the connection network into a reconfiguration network.

2. The system of claim 1, further comprising:
a hold process structured to prevent data from passing through at least one of the communication channels.

3. The system of claim 2, in which the at least one of the communication channels is upstream from the first processor.

4. The system of claim 1, further comprising:
a flush process structured to remove data passing through at least one of the communication channels.

5. The system of claim 1 in which the communication channels comprise at least one a protocol register in each of the communication channels.

6. The system of claim 1, in which the network reconfigurator is also structured to reprogram the connection network into an operating network.

7. A method for re-configuring elements in a multi-element processor array that is already presently operating, comprising:
acquiring reconfiguration data;
coupling individual processors through communication channels set as reconfiguration channels;
loading local reconfiguration data into a local processor;
sending downstream reconfiguration data to downstream processors across the reconfiguration channels; and
after receiving an indication that the downstream processors have been reconfigured, setting the communication channels to be execution channels.

8. The method of claim 7, further comprising:
receiving a request to reconfigure the processor array.

9. The method of claim 7, further comprising:
accessing an external memory that stores the reconfiguration data.

10. The method of claim 7, further comprising:
after the indication has been received that the downstream processors have been reconfigured, starting the local processor.

11. The method of claim 7, further comprising:
removing from the reconfiguration data configuration components for an associated memory processor; and
passing the configuration components for an associated memory processor to the associated memory processor.

12. The method of claim 7, further comprising:
issuing a hold command to prevent data from passing through at least one of the communication channels.

13. The method of claim 12, further comprising:
issuing a flush command to cause at least one of the communication channels to remove data.

* * * * *